US012001320B2

United States Patent
Liu et al.

(10) Patent No.: US 12,001,320 B2
(45) Date of Patent: Jun. 4, 2024

(54) CLOUD ARCHITECTURE FOR REINFORCEMENT LEARNING

(71) Applicant: MICROSOFT TECHNOLOGY LICENSING, LLC, Redmond, WA (US)

(72) Inventors: Xiaoyan Liu, Bothell, WA (US); Steve K. Lim, Redmond, WA (US); Taylor Paul Spangler, Kirkland, WA (US); Kashyap Maheshkumar Patel, Bellevue, WA (US); Marc Mas Mezquita, Barcelona (ES); Levent Ozgur, Seattle, WA (US); Timothy James Chapman, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/855,434

(22) Filed: Jun. 30, 2022

(65) Prior Publication Data

US 2023/0367697 A1 Nov. 16, 2023

Related U.S. Application Data

(60) Provisional application No. 63/341,791, filed on May 13, 2022.

(51) Int. Cl.
*G06F 9/44* (2018.01)
*G06F 11/36* (2006.01)
(Continued)

(52) U.S. Cl.
CPC ........ *G06F 11/3664* (2013.01); *G06F 11/368* (2013.01); *G06F 11/3688* (2013.01); *G06N 3/08* (2013.01); *G06N 3/10* (2013.01)

(58) Field of Classification Search
None
See application file for complete search history.

(56) References Cited

U.S. PATENT DOCUMENTS

| 9,536,191 B1 | 1/2017 | Arel et al. |
| 9,792,397 B1 | 10/2017 | Nagaraja |

(Continued)

FOREIGN PATENT DOCUMENTS

| WO | 2021058626 A1 | 4/2021 |
| WO | 2021062226 A1 | 4/2021 |

OTHER PUBLICATIONS

Catovic, et al., "Linnaeus: A highly reusable and adaptable ML Based Log Classification Pipeline", In Repository of arXiv:2103.06927v1, Mar. 11, 2021, 8 Pages.

(Continued)

*Primary Examiner* — Qamrun Nahar
(74) *Attorney, Agent, or Firm* — Shook, Hardy & Bacon L.L.P.

(57) ABSTRACT

The technology described herein provides a cloud reinforcement-learning architecture that allows a single reinforcement-learning model to interact with multiple live software environments. The live software environments and the single reinforcement-learning model run in a distributed computing environment (e.g., cloud environment). The single reinforcement-learning model may run on a first computing device(s) with a graphical processing unit (GPU) to aid in training the single reinforcement-learning model. At a high level, the single reinforcement-learning model may receive state telemetry data from the multiple live environments. The single reinforcement-learning model selects an available action for each set of state telemetry data received and communicates the selection to appropriate the test agent. The test agent then facilitates completion of the action within the software instance being tested in the live (Continued)

environment. A reward is then determined for the action. The single reinforcement-learning model may then be trained.

20 Claims, 21 Drawing Sheets

(51) Int. Cl.
  *G06N 3/08* (2023.01)
  *G06N 3/10* (2006.01)

(56) References Cited

U.S. PATENT DOCUMENTS

| | | | |
|---|---|---|---|
| 10,346,741 B2 | 7/2019 | Mnih | |
| 10,733,501 B2 | 8/2020 | Silver et al. | |
| 10,802,864 B2* | 10/2020 | Nag | G06N 3/006 |
| 11,087,175 B2 | 8/2021 | Kim | |
| 11,465,650 B2 | 10/2022 | Saxena | |
| 11,669,753 B1 | 6/2023 | Gupta | |
| 11,775,817 B2 | 10/2023 | Brandt et al. | |
| 11,790,239 B2 | 10/2023 | Kour et al. | |
| 11,853,901 B2 | 12/2023 | Ko | |
| 11,861,579 B1 | 1/2024 | Capers | |
| 11,889,819 B2 | 2/2024 | Worth | |
| 11,892,941 B2 | 2/2024 | Rao Pandu | |
| 2009/0300423 A1 | 12/2009 | Ferris et al. | |
| 2018/0293498 A1 | 10/2018 | Campos et al. | |
| 2018/0329788 A1 | 11/2018 | Blum et al. | |
| 2019/0286546 A1 | 9/2019 | Johnston et al. | |
| 2020/0156243 A1 | 5/2020 | Ghare et al. | |
| 2020/0167687 A1 | 5/2020 | Genc | |
| 2020/0278920 A1 | 9/2020 | Khakare et al. | |
| 2021/0064515 A1* | 3/2021 | Xu | G06N 3/08 |
| 2021/0073110 A1 | 3/2021 | Vidal et al. | |
| 2021/0187733 A1 | 6/2021 | Lee | |
| 2021/0232922 A1 | 7/2021 | Zhang et al. | |
| 2021/0279577 A1 | 9/2021 | West et al. | |
| 2021/0334696 A1* | 10/2021 | Traut | G06N 3/006 |
| 2021/0405727 A1* | 12/2021 | Singh | G05B 13/0265 |
| 2023/0394758 A1 | 12/2023 | Fu | |
| 2023/0419113 A1 | 12/2023 | Genc | |

OTHER PUBLICATIONS

Collins, et al., "Deep Reinforcement Learning based Android Application GUI Testing", In Proceedings of Cyber Security Experimentation and Test Workshop, Sep. 21, 2017, pp. 186-194.
"International Search Report and Written Opinion Issued in PCT Application No. PCT/US23/015988", dated Jun. 28, 2023, 14 Pages.
"International Search Report and Written Opinion Issued in PCT Application No. PCT/US23/017013", dated Jun. 30, 2023, 14 Pages.
"Get started with Robo tests", Retrieved from: https://web.archive.org/web/20220324090129/https://firebase.google.com/docs/test-lab/android/robo-ux-test, Mar. 24, 2022, 6 Pages.
"Gym", Retrieved from: https://web.archive.org/web/20220415123137/https:/gym.openai.com/, Apr. 15, 2022, 3 Pages.
Microsoft, "ray-on-aml", Retrieved from: https://web.archive.org/web/20220418071031/https:/github.com/microsoft/ray-on-aml/, Apr. 18, 2022, 7 Pages.
"RLlib: Industry-Grade Reinforcement Learning", Retrieved from: https://web.archive.org/web/20220418140512/https:/docs.ray.io/en/latest/rllib/index.html, Apr. 18, 2022, 4 Pages.
"Stanford Research Institute Problem Solver", Retrieved from: https://en.wikipedia.org/wiki/Stanford_Research_Institute_Problem_Solver, Aug. 9, 2021, 4 Pages.
"UI/Application Exerciser Monkey", Retrieved from: https://web.archive.org/web/20220318102138/https://developer.android.com/studio/test/other-testing-tools/monkey, Mar. 18, 2022, 5 Pages.

Afridi, et al., "Deep Reinforcement Learning Approach for Inventory Policy Tested in Simulation Environment", In Proceedings of the Winter Simulation Conference, Dec. 14, 2020, 4 Pages.
Akkaya, et al., "Solving rubik's cube with a robot hand", In Repository of arXiv:1910.07113v1, Oct. 16, 2019, 51 Pages.
Amalfitano, et al., "Using gui ripping for automated testing of android applications", In Proceedings of the 27th IEEE/ACM International Conference on Automated Software Engineering, Sep. 3, 2012, pp. 258-261.
Anand, et al., "Automated concolic testing of smartphone apps", In Proceedings of the ACM SIGSOFT 20th International Symposium on the Foundations of Software Engineering, Nov. 11, 2012, pp. 1-11.
Andrychowicz, et al., "Hindsight experience replay", In Repository of arXiv:1707.01495v1, Jul. 5, 2017, 15 Pages.
Bengio, et al., "Curriculum learning", In Proceedings of the 26th Annual International Conference on Machine Learning, Jun. 14, 2009, pp. 41-48.
Blackmist, et al., "Reinforcement learning (preview) with Azure Machine Learning", Retrieved from: https://docs.microsoft.com/en-us/azure/machine-learning/how-to-use-reinforcement-learning, Apr. 1, 2022, 14 Pages.
Borges, et al., "Guiding app testing with mined interaction models", In Proceedings of IEEE/ACM 5th International Conference on Mobile Software Engineering and Systems, May 27, 2018, pp. 133-143.
Bridge, et al., "Event Tracing", Retrieved from: https://docs.microsoft.com/en-us/windows/win32/etw/event-tracing-portal, Jan. 8, 2021, 3 Pages.
Cao, et al., "Crawldroid: Effective model-based gui testing of android apps", In Proceedings of the Tenth Asia-Pacific Symposium on Internetware, Sep. 16, 2018, 6 Pages.
Chen, et al., "Learning action-transferable policy with action embedding", In Repository of arXiv preprint arXiv:1909.02291, May 10, 2021, 11 Pages.
Colas, et al., "Curious: Intrinsically motivated modular multi-goal reinforcement learning", In Repository of arXiv:1810.06284v1, Oct. 15, 2018, 9 Pages.
Gao, et al., "Android testing via synthetic symbolic execution", In Proceedings of 33rd IEEE/ACM International Conference on Automated Software Engineering, Sep. 3, 2018, pp. 419-429.
George, et al., "Microsoft UI Automation", Retrieved from: https://docs.microsoft.com/en-us/dotnet/framework/ui-automation/, Sep. 15, 2021, 2 Pages.
Graves, et al., "Automated curriculum learning for neural networks", In International conference on machine learning, Jul. 17, 2017, 10 Pages.
Halfin, et al., "Give feedback with the Feedback Hub", Retrieved from: https://docs.microsoft.com/en-us/windows-insider/feedback-hub/feedback-hub-app, Mar. 26, 2021, 13 Pages.
Harries, et al., "Drift: Deep reinforcement learning for functional software testing", In Proceedings of 33rd Deep Reinforcement Learning Workshop, Jul. 16, 2020, 10 Pages.
Hessel, et al., "Multi-task deep reinforcement learning with popart", In Proceedings of the AAAI Conference on Artificial Intelligence, Jul. 17, 2019, pp. 3796-3803.
Jamrozik, et al., "Droidmate: a robust and extensible test generator for android", In Proceedings of the International Conference on Mobile Software Engineering and Systems, May 14, 2016, pp. 293-294.
Li, et al., "Humanoid: A deep learning-based approach to automated black-box android app testing", In Proceedings of 34th IEEE/ACM International Conference on Automated Software Engineering, Nov. 11, 2019, pp. 1070-1073.
Liang, et al., "RLlib: Abstractions for distributed reinforcement learning", In Proceedings of International Conference on Machine Learning, Jul. 3, 2018, 10 Pages.
Lin, et al., "Test transfer across mobile apps through semantic mapping", In Proceedings of 34th IEEE/ACM International Conference on Automated Software Engineering, Nov. 11, 2019, pp. 42-53.

(56) References Cited

OTHER PUBLICATIONS

Machiry, et al., "Dynodroid: An input generation system for android apps", In Proceedings of the 9th Joint Meeting on Foundations of Software Engineering, Aug. 18, 2013, pp. 224-234.

Mahmood, et al., "Evodroid: Segmented evolutionary testing of android apps", In Proceedings of the 22nd ACM SIGSOFT International Symposium on Foundations of Software Engineering, Nov. 11, 2014, pp. 599-609.

Mao, et al., "Sapienz: Multiobjective automated testing for android applications", In Proceedings of the 25th International Symposium on Software Testing and Analysis, Jul. 18, 2018, pp. 94-105.

Mariani, et al., "Autoblacktest: Automatic black-box testing of interactive applications", In Proceedings of IEEE fifth international conference on software testing, verification and validation, Apr. 17, 2012, pp. 81-90.

Marshall, et al., "Application Verifier—Overview", Retrieved from: https://docs.microsoft.com/en-us/windows-hardware/drivers/devtest/application-verifier, Mar. 26, 2022, 8 Pages.

Marshall, et al., "Driver Verifier", Retrieved from: https://docs.microsoft.com/en-us/windows-hardware/drivers/devtest/driver-verifier, Dec. 15, 2021, 8 Pages.

Mnih, et al., "Playing Atari with Deep Reinforcement Learning", In Repository of arXiv:1312.5602v1, Dec. 19, 2013, 9 Pages.

Yazdanbakhsh, et al., "Massively Large-Scale Distributed Reinforcement Learning with Menger", Retrieved from: https://ai.googleblog.com/2020/10/massively-large-scale-distributed.html, Oct. 2, 2020, 6 Pages.

Mohammed, et al., "An empirical comparison between monkey testing and human testing (wip paper)", In Proceedings of the 20th ACM SIGPPLAN/SIGBED International Conference on Languages, Jun. 23, 2019, pp. 188-192.

Narvekar, et al., "Curriculum learning for reinforcement learning domains: A framework and survey", In Journal of Machine Learning Research, vol. 21, Jul. 2020, pp. 1-50.

Pan, et al., "Reinforcement learning based curiosity-driven testing of android applications", In Proceedings of the 29th ACM SIGSOFT International Symposium on Software Testing and Analysis, Jul. 18, 2020, pp. 153-164.

Parisotto, et al., "Actormimic: Deep multitask and transfer reinforcement learning", In Repository of arXiv:1511.06342v1, Nov. 19, 2015, pp. 1-15.

Patel, et al., "On the effectiveness of random testing for android: or how i learned to stop worrying and love the monkey", In Proceedings of the 13th International Workshop on Automation of Software Test, May 28, 2018, pp. 34-37.

Portelas, et al., "Automatic Curriculum Learning For Deep RL: A Short Survey", In Repository of arXiv:2003.04664v2, May 28, 2020, 8 Pages.

Portelas, et al., "Teacher algorithms for curriculum learning of deep rl in continuously parameterized environments", In Conference on Robot Learning, Oct. 16, 2019, pp. 1-19.

Pouyanfar, et al., "A survey on deep learning: Algorithms, techniques, and applications", In Proceedings of ACM Computing Surveys, vol. 51, No. 5, Sep. 2018, 36 Pages.

Pritz, et al., "Jointly-Learned State-Action Embedding for Efficient Reinforcement Learning", In Proceedings of the 30th ACM International Conference on Information \& Knowledge Management, Nov. 1, 2021, pp. 1447-1456.

Resende, Pedro Tomas Mendes, "Reinforcement Learning of Task Plans for Real Robot Systems", In Thesis of Master of Science Degree in Electrical and Computer Engineering, Oct. 2014, 107 Pages.

Schulman, et al., "Proximal Policy Optimization Algorithms", In Repository of arXiv:1707.06347v2, Aug. 28, 2017, 12 Pages.

Zheng, et al., "Automatic Web Testing Using Curiosity-Driven Reinforcement Learning", In Repository of arXiv:2103.06018v1, Mar. 10, 2021, 13 Pages.

Shim, et al., "What are virtual machine scale sets?", Retrieved from: https://docs.microsoft.com/en-us/azure/virtual-machine-scale-sets/overview, Nov. 2, 2021, 5 Pages.

Spieker, et al., "Reinforcement learning for automatic test case prioritization and selection in continuous integration", In Proceedings of the 26th ACM SIGSOFT International Symposium on Software Testing and Analysis, Jul. 10, 2017, pp. 12-22.

Eskonen, et al., "Automating GUI Testing with Image-Based Deep Reinforcement Learning", In Proceedings of IEEE International Conference on Autonomic Computing and Self-Organizing Systems, Aug. 17, 2020, pp. 160-167.

"International Search Report and Written Opinion Issued in PCT Application No. PCT/US23/013377", dated Jun. 12, 2023, 11 Pages.

"International Search Report and Written Opinion Issued in PCT Application No. PCT/US23/013378", dated Jun. 7, 2023, 13 Pages.

Romdhana, et al., "Deep Reinforcement Learning for Black-Box Testing of Android Apps", In Repository of arXiv:2101.02636v1, Jan. 7, 2021, 26 Pages.

U.S. Appl. No. 17/855,434, filed Jun. 30, 2022.

Zheng, et al., "Wuji: Automatic online combat game testing using evolutionary deep reinforcement learning", In Proceedings of 34th IEEE/ACM International Conference on Automated Software Engineering, Nov. 11, 2019, pp. 772-784.

Su, et al., "Guided, stochastic model-based GUI testing of android apps", In Proceedings of 11th Joint Meeting on Foundations of Software Engineering, Sep. 4, 2017, pp. 245-256.

Sutton, et al., "Reinforcement Learning: An Introduction", In Publication of The MIT Press, Jan. 1, 2018, 444 Pages.

Terry, J K., "Using PettingZoo with RLlib for Multi-Agent Deep Reinforcement Learning", Retrieved from: https://towardsdatascience.com/using-pettingzoo-with-rllib-for-multi-agent-deep-reinforcement-learning-5ff47c677abd, Sep. 25, 2021, 16 Pages.

U.S. Appl. No. 63/341,791, filed May 13, 2022.

U.S. Appl. No. 17/854,640, filed Jun. 30, 2022.

U.S. Appl. No. 17/855,240, filed Jun. 30, 2022.

U.S. Appl. No. 17/948,513, filed Sep. 20, 2022.

"Non-Final Office Action Issued in U.S. Appl. No. 17/854,640", dated Oct. 30, 2023, 19 Pages.

Cao, et al., "Automatic HMI Structure Exploration Via Curiosity-Based Reinforcement Learning", In Proceedings of IEEE/ACM International Conference on Automated Software Engineering, Nov. 15, 2021, pp. 1151-1155.

Huurman, et al., "Generating API Test Data Using Deep Reinforcement Learning", Proceedings of the IEEE/ACM 42nd International Conference on Software Engineering Workshops, Sep. 25, 2020, pp. 541-544.

Non-Final Office Action mailed on Feb. 9, 2024, in U.S. Appl. No. 17/855,240, 20 pages.

Pang, et al., "A simulator for reinforcement learning training in the recommendation field," IEEE International conference on Parallel and Distributed Processing with Applications, 2020, 06 Pages.

Kuznetsov, et al., "Automated Software Vulnerability Testing Using Deep Learning Methods", IEEE,2019, PP. 837-841.

Nguyen, et al., "Prioritizing automated user interface tests using reinforcement learning", ACM, 2019, 10 pages.

Notice of Allowance mailed on Apr. 15, 2024, in U.S. Appl. No. 17/854,640 14 pages.

Pan, et al., "Reinforcement Learning Based Curiosity-Driven Testing of Android Applications", ACM, 2020, pp. 153-164.

Zheng, et al., "Wuji: Automatic Online Combat Game Testing Using Evolutionary Deep Reinforcement Learning", IEEE, 2019, PP. 772-784.

\* cited by examiner

CLOUD ARCHITECTURE FOR REINFORCEMENT LEARNING

CROSS-REFERENCE TO RELATED APPLICATIONS

This application claims the benefit of U.S. Provisional Application No. 63/341,791, filed May 13, 2022, which is incorporated herein by reference in its entirety.

BACKGROUND

Automated software testing for complex environments, such as operating systems or the applications running thereon, should simulate the broad diversity of ways that users interact with the software being tested. Simulated usage during testing allows for detection of bugs before they turn into usability or security issues after deployment. Simulated usage should be representative of scenarios that are known to produce bugs, while providing enough variety to push the software being tested and/or the operating system into a broad range of plausible states. Similarly, automated testing should test as many possible interaction scenarios as possible.

Some systems rely on heuristically driven methodologies, such as generating random events or machine learning-based approaches to navigate interfaces. Despite the adoption of these methodologies in testing, limitations still exist. For example, some machine-learning based models only exploit historically observed paths during testing, where in many cases bugs or scenarios are found in paths that have not been observed before. Existing machine-learning models may not effectively learn how to follow paths that are different from previously observed paths.

SUMMARY

The technology described herein provides a cloud reinforcement-learning architecture that allows a single reinforcement-learning model to interact with multiple live software environments. The live software environments and the single reinforcement-learning model run in a distributed computing environment (e.g., cloud environment). The single reinforcement-learning model may run on a first computing device(s) with a graphical processing unit (GPU) to aide in training the single reinforcement-learning model. The multiple live software environments may be provided by virtual machines running on a different computing device(s), which may not have a GPU.

At a high level, the single reinforcement-learning model may receive state telemetry data from the multiple live environments. Each live environment may include a test agent and a software instance undergoing testing. The multiple live environments may each be testing the same software. Thus, each live environment may include a different instance of the same software. The state telemetry data may include an image of an active user interface. The state telemetry data may also include a description of user interface elements that may be interacted with through the active user interface. The state telemetry data may be different for each live environment.

The single reinforcement-learning model selects an available action for each set of state telemetry data received and communicates the selection to appropriate the test agent. The test agent then facilitates completion of the action within the software instance being tested in the live environment. A reward is then determined for the action. The reward is based on whether the action completed a task. In this way, a single reinforcement-learning model can explore multiple live environments in parallel. The combined interactions are then used to train the single reinforcement-learning model.

Reinforcement learning aims to build intelligent agents that make decisions in complex and uncertain environments. The reinforcement-learning agent is not directly supervised to take actions in any given situation, but rather learns which sequences of actions generate the most reward(s) through the observed states and rewards from the environment. In the software-testing environment, the state may include user interface features and actions may include interactions with user interface elements.

Once the reinforcement-learning model learns to perform a task within a software, it can perform the task as part of automated testing of the software. Automated software testing at scale for complex environments like operating systems or services benefit from high-quality testing experiences that mimic user actions, given the broad diversity of ways that users interact with their devices. The various methods users take to perform a task may not be observable for technical reasons and/or privacy reasons. An outcome generated by user actions to achieve a final state may be observable, but how users got to that final state may be unknown and therefore unusable for playback software testing. Playback testing records the activity of the user and then repeats it during testing. For example, actions a user takes to bold text could be recorded. A playback tool will record the actions and save them in a repeatable test that be run as part of future testing. Reinforcement learning can help build a set of possible actions to achieve the desired state. The set of possible actions can be used to determine whether various methods of completing a task are bug free.

BRIEF DESCRIPTION OF THE DRAWINGS

The present invention is described in detail below with reference to the attached drawing figures, wherein.

DETAILED DESCRIPTION

Figure 1:
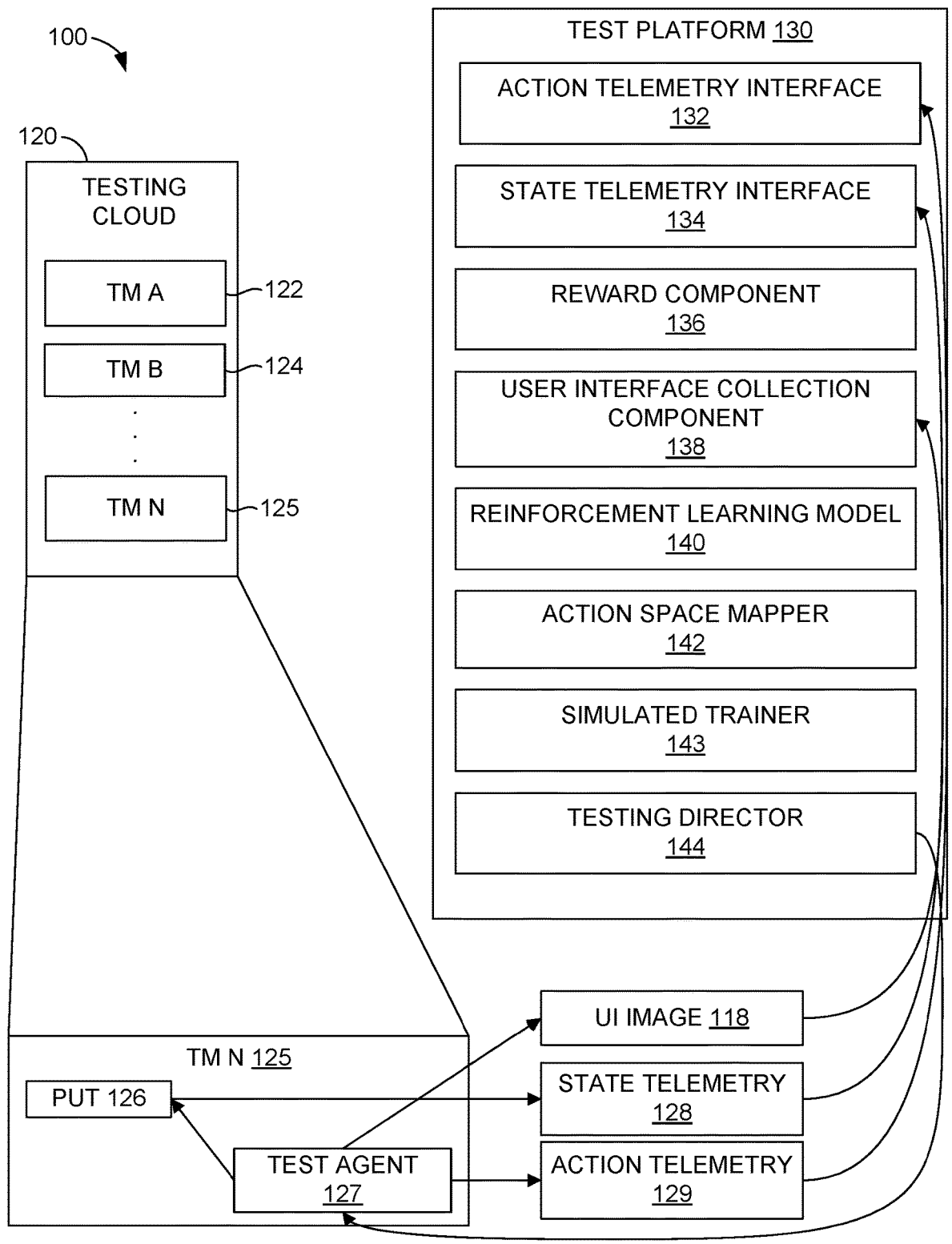
FIG. 1 is a block diagram of a reinforcement learning, software testing environment, in accordance with aspects of the technology described herein.

The technology described herein provides a cloud reinforcement-learning architecture that allows a single reinforcement-learning model to interact with multiple live software environments. The live software environments and the single reinforcement-learning model run in a distributed computing environment (e.g., cloud environment).

Interacting with multiple live software environments significantly reduces an amount of time a reinforcement-learning model needs to learn a task. Learning a task may take x number of iterations (e.g., select action, take action, receive reward). If the reinforcement-learning model is interacting with four live environments, instead of one, then the x number of interactions may be collected in ¼ the time.

A live environment contrasts with a simulated environment. The live environment is a computing environment with which the reinforcement-learning model will interact when deployed. For example, a reinforcement-learning model may be trained to perform a task (e.g., bold text, change text font) within a software application, such as MICROSOFT WORD. In this example, MICROSOFT WORD, an operating system, and a physical or virtual machine are the primary components of the live environment. A simulated environment, however, may not have a running version of MICROSOFT WORD operating, and therefore the reinforcement-learning model would not interact with MICROSOFT WORD in the simulated environment.

Reinforcement learning aims to build intelligent agents that make decisions in complex and uncertain environments. The reinforcement-learning agent is not directly supervised to take actions in any given situation, but rather learns which sequences of actions generate the most reward(s) through the observed states and rewards from the environment. In the software-testing environment, the state may include user interface features and actions may include interactions with user interface elements. These state, action, and reward concepts may be formally represented by the finite Markov decision processes (MDP) for sequential decision making. An MDP is a tuple $<S, A, T, R, \gamma>$ where S is a finite set of states, A is a finite set of actions, T is a state transition function, R is a reward function and $\gamma$ is a discount factor.

The technology described herein provides a cloud reinforcement-learning architecture that allows a single reinforcement-learning model to interact with multiple live software environments. The live software environments and the single reinforcement-learning model run in a distributed computing environment (e.g., cloud environment). The single reinforcement-learning model may run on a first computing device(s) with a graphical processing unit (GPU) to aide in training the single reinforcement-learning model. The multiple live software environments may be provided by virtual machines running on a different computing device(s), which may not have a GPU.

At a high level, the single reinforcement-learning model may receive state telemetry data from the multiple live environments. Each live environment may include a test agent and a software instance undergoing testing. The multiple live environments may each be testing the same software. Thus, each live environment may include a different instance of the same software. The state telemetry data may include an image of an active user interface. The state telemetry data may also include a description of user interface elements that may be interacted with through the active user interface. The state telemetry data may be different for each live environment.

The single reinforcement-learning model selects an available action for each set of state telemetry data received and communicates the selection to appropriate the test agent. The test agent then facilitates completion of the action within the software instance being tested in the live environment. A reward is then determined for the action. The reward is based on whether the action completed a task. In this way, a single reinforcement-learning model can explore multiple live environments in parallel. The combined interactions are then used to train the single reinforcement-learning model.

Once the reinforcement-learning model learns to perform a task within a software, it can perform the task as part of automated testing of the software. Automated software testing at scale for complex environments like operating systems or services benefit from high-quality testing experiences that mimic user actions, given the broad diversity of ways that users interact with their devices. The various methods users take to perform a task may not be observable for technical reasons and/or privacy reasons. An outcome generated by user actions to achieve a final state may be observable, but how users got to that final state may be unknown and therefore unusable for playback software testing. Playback testing records the activity of the user and then repeats it during testing. For example, actions a user takes to bold text could be recorded. A playback tool will record the actions and save them in a repeatable test that be run as part of future testing.

Reinforcement learning can help build a set of possible actions to achieve the desired state. The set of possible actions can be used to determine whether various methods of completing a task are bug free. Traditional approaches that focus on randomly interacting with user interfaces to cover all the combinations of input is extremely inefficient, translating into poor coverage and throughput; conversely, scripted testing does not provide significant user interaction variation to provide broad coverage. These and other problems are solved herein through a multi-task reinforcement-learning framework that is usable for large-scale automated software testing.

The technology described herein can successfully reproduce multiple scenarios simultaneously at scale with improved efficiency compared to random testing and machine learning model based testing to find bugs that affect user experiences. In addition, the technology also may employ a scale of tens to thousands of virtual and/or physical workers residing on physical hardware or on virtual machines to emulate how users will interact with applications.

Reinforcement learning (RL) offers inherent mechanisms to be effective for these challenges. The balance of exploration and exploitation helps discover paths through the user interface (UI) that are bounded to plausible paths without needing human (and potentially private) data. Exploitation takes the most rewarding action given current knowledge, while exploration takes an action to gather more knowledge. In addition, reinforcement learning also provides resiliency relative to more static testing, as underlying code and user interfaces continually evolve and vary due to code updates from developers and experiments run by engineering teams. As a result, reinforcement learning can be used to generalize across subtle changes in the action space for the same rewards over time.

The technology described herein may train a reinforcement-learning model to perform multiple tasks. In general, a goal of reinforcement learning is to learn one specific task at a time. Multitask reinforcement-learning aims to learn a single task conditioned policy $\pi$ (a|s, z), where s represents current state and z represents a task. The idea behind multitask reinforcement learning is that the knowledge learned from training one task can be transferred to the training of other tasks. When training networks with multiple tasks jointly, the agents may learn to share and reuse components across different tasks. Such sharing and reuse provides higher overall efficiency and more enables generation of more complex sequencing of tasks to replicate human behavior when multiple tasks are involved.

In aspects, the reinforcement learning occurs in an undefined action space. The action space is the set of all actions that the testing platform can take on the software being tested. When testing user interface features, an action may include an interaction with an interface element (e.g., button, menu). In an undefined action space, the actions available to the testing platform outside of the current state are initially unknown to the testing platform. Further, the programmed state change that should result from taking available actions from the current state is also unknown to the testing platform. This is in contrast to many existing testing systems that require a developer to provide a defined action space to facilitate testing.

The technology described herein may train a reinforcement-learning model in a simulated environment before placing the reinforcement-learning model in a live environment. As explained, a simulated environment contrasts with a live environment. Training in a simulated environment has several advantages over training in a live environment. For example, the simulated training may progress faster than training in a live environment. In a live environment, new interfaces and states can only be generated in response to a live action. In the simulated environment, the new state may be recalled from memory. Recalling existing state characteristics from storage may be faster than generating a new state. The faster training reduces computer usage.

In order to be effective, the simulated environment may provide inputs to the reinforcement-learning model in the same format as the reinforcement-learning model receives inputs from the live environment. In aspects, the simulated environment is used to train a reinforcement-learning model to perform tasks in a software application. In this context, the simulated input may represent a simulated user interface in the same form the software application would represent a live user interface.

In aspects, both the simulated user interface and an actual user interface may be represented by an image of the user interface. In addition, state telemetry data may be presented for both the simulated user interface and the live user interface. The state telemetry data may provide a description of interface elements that are available for the reinforcement-learning model to interact with. The reinforcement-learning model may then select as an action one of the interface elements and a corresponding interaction (e.g., click, hover). The simulation will then provide a reward for the selected action, just as a reinforcement-learning model would receive after taking an action in a live environment.

In aspects, the simulated environment may include a simulated action model built using a record of previous user-interface interactions with the live environment. The action model may be a graph with a user interface (user interface objects (e.g., buttons, text boxes, interactive objects) and their associated state information (e.g., attributes of what functionality they belong to, where they visually sit, how they look)) produced by the software represented as nodes and actions represented as edges. For example, if a second user interface is produced by clicking on an interface element on a first user interface, then the first and second user interfaces may be represented as nodes in the graph connected by an edge that represents the action of clicking on the interface element. State telemetry data and an image of the user-interface represented by the node may be associated with each node. The state telemetry data may include a list of user-interface elements in the user interface.

The user-interface interactions that are used to build the simulated action model may be performed and recorded by an automated system, such as a software testing system executing playback or exploration testing of a software instance in a live environment. The automated system may include a reinforcement-learning model. Alternatively or additionally, the automated system may include other types of systems, such as a random walk system that explores the live environment and learns how to perform tasks. These other types of systems, such as the random walk system, may record state telemetry data and action telemetry data that may be used to build the simulated action model.

In aspects, the training in the simulated environment may act as pre-training for training in the live environment. Once pre-trained, the reinforcement-learning model may be deployed in a live environment and continue to learn how to perform the same task in different ways, learn how to perform additional tasks, and/or improve performance of a task learned in pre-training. Without the pre-training, a reinforcement-learning model's first interaction with the live environment would be similar to an arbitrary guess. In fact, in a sparse-reward live environment, the reinforcement-learning model may need to take a large number of actions before achieving enough rewards to make action decisions that are more than arbitrary guesses. Pre-training allows the reinforcement-learning model to make decisions that are more valuable from the start and accumulate useful training data more quickly. The overall combination of pre-training in a simulated environment and training a live environment can be more computationally efficient than solely training in a live environment while achieving the same overall performance accuracy. Once trained, the reinforcement-learning model can be part of an automated software-testing platform.

Automated software testing for complex environments, such as operating systems or the applications running thereon, should simulate the broad diversity of ways that users interact with the software being tested. Simulated usage during testing allows for detection of bugs before they turn into usability or security issues after deployment. Simulated usage should be representative of scenarios that are known to produce bugs, while providing enough variety to push the software being testing and operating system into a broad range of plausible states. Similarly, automated testing should test as many possible interaction scenarios as possible.

Some systems rely on heuristically driven methodologies, such as generating random events or machine learning-based approaches to navigate interfaces. Despite the adoption of these methodologies in testing, limitations still exist. For example, some machine-learning based models only exploit historically observed paths during testing, where in many cases bugs or scenarios are found in paths that have not been observed before. Existing machine-learning models may not effectively learn how to follow paths that are different from previously observed paths. Existing methods often fail to adapt when there are subtle changes to the tasks, such as when names of interface elements change or their positions change. The reinforcement-learning model described herein can be more resilient to these subtle changes than hard-coded or more heuristic-driven tests.

Automated Testing Environment

Turning now to FIG. 1, an exemplary software-testing environment 100 is shown, according to an aspect of the technology described herein. Among other components not shown, the software testing environment 100 includes a testing cloud 120 with test machine A 122, test machine B 124, and test machine N 125, and test platform 130, all connected by a computer network. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Each of the components shown in FIG. 1 may be implemented via any type of computing device, such as computing device 1100 described in connection to FIG. 11. These components may communicate with each other via a network, which may include, without limitation, one or more local area networks (LANs) and/or wide area networks (WANs). In exemplary implementations, a network comprises the Internet and/or a cellular network, amongst any of a variety of possible public and/or private networks.

Moreover, these components, functions performed by these components, or services carried out by these components may be implemented at appropriate abstraction layer(s), such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein regarding specific components shown in example system 100, it is contemplated that in some aspects functionality of these components can be shared or distributed across other components.

The technology described herein includes a framework in which the agent interacts with a plurality of test machines (e.g., 30, 60, 100, 1000) simultaneously to collect test data. Each test machine 125 has an operating system and a product under test 126 (e.g., MICROSOFT WORD) pre-installed. The testing agent 127 opens the product under test (PUT) 126 and starts to interact with the product under a test interface. The testing agent 127 observes the current state within the environment, takes an action, and observes the next state.

The testing cloud environment 120 includes test machine A 122, test machine B 124, and test machine N 125. The N designation on test machine N 125 is intended to indicate that any number of test machines may be used in the testing cloud 120. Each test machine may include software being tested (i.e., the product under test) along with a simulated computing environment, including an operating system. The testing director 144 may assign different test types to different machines. For example, a first group of machines may do random walk testing, while a second group follows task sequences predicted by the pattern detector 140 to complete a task. A third group may perform pioneering exploration, which is directed to exploring previously unexplored, and thus unknown areas of the action space.

The test platform 130 includes an action telemetry interface 132, state telemetry interface 134, reward component 136, the user-interface collection component 138, the reinforcement-learning model 140, the action space mapper 142, a simulated trainer 143, and the testing director 144.

The action telemetry interface 132 receives action telemetry data 129 from the testing agent 127 running on the plurality of test machines (TM)s. The action telemetry data includes descriptions of actions (alternatively described simply as "actions") the various testing agents took on the test machines. Actions may include all possible interactive actions with the software interface. In other words, actions may be any action (e.g., select, hover, enter text) a user could perform with an interface element (e.g., button, menu, text box). In one aspect, the actions are determined through interrogation of an accessibility layer (e.g., the Microsoft UI Automation System). The accessibility layer or function framework may be used by applications, like screen readers, for low vision users. The number of available actions for each state may be dynamic. Some software applications have a very large action space. For example, some applications may have 100,000 or more actions. During testing, the identified actions may be stored in a database. In one aspect, the identified actions are stored in a multi-model database service, such as a key-value store.

The state telemetry interface 134 receives state telemetry data 128 from the product under test 126 (i.e., instance of software being tested). The state telemetry data can include new interface elements presented in response to the action along with other changes (e.g., content changes) made to the interface. The state telemetry data can also include system and software health information, such as whether the system crashed, hung, or the like. In some aspects, the state telemetry data may take the form of an image of the UI that resulted from an action. Taking an image of the UI is resource intensive and it may not be an efficient practice to collect an image for each test action. In aspects, UI images are collected during action replay when the pattern being replayed is associated with above a threshold confidence factor to conserve resources require to capture and store the UI images. In aspects, the confidence factor threshold could be above 0.7, above 0.8, and/or above 0.9. The confidence score indicates a confidence that the pattern is correctly identified by the pattern detector 140.

The reward component 136 evaluates a newly achieved state and assigns a reward. The reward may be associated with the state and the action that produced the state. A goal is to test functionality as users experience the functionality in applications and in an operating system shell. The reward function may be formulated differently in different experiments. In a first aspect, a positive reward is triggered if the action taken by the agent matches a target action (e.g., when the agent takes the actions of clicking the Bold button or clicking the Font button from the menu bar) or achieves a target state. The action and/or state and associated reward may be provided as training data.

The testing system may recognize when a sought after state is achieved by comparing a new state to a reward criteria. The reward criteria are defined to reflect the sought after result. In one example, the sought after states represent scenario completions, such as the completion of a task within the software being tested. A task may be, for example, taking a picture, entering text, bolding text, or any number of other possible tasks. Many of these tasks may require a sequence of multiple interactions. For example, a task may require opening a menu, selecting a menu item, providing input, and then selecting the enter button. In contrast, simply opening a menu interface and then closing the same interface, without additional interactions, may be an example of failing to complete a scenario. Again, the sought after state can be defined by a reward criteria and assigned a reward value when produced by the testing agent.

The user-interface collection component 138 collects images of user interfaces during training and/or testing. A new image may be captured after every action. The user-interface collection component 138 may normalize UI images, for example to 300×300 pixels.

The reinforcement-learning model 140 learns how to perform tasks in the software being tested and then performs the tasks as part of software testing. In aspects, the trained reinforcement-learning model 140 can perform tasks in different versions of the software that have different user interface elements than the version on which the model was trained.

Reinforcement learning aims to build intelligent agents that make decisions in complex and uncertain environments. The reinforcement-learning agent is not directly supervised to take actions in any given situation, but rather learns which sequences of actions generate the most reward(s) through the observed states and rewards from the environment. In the software-testing environment, the state may include user interface features and actions may include interactions with user interface elements. These state, action, and reward concepts may be formally represented by the finite MDP for sequential decision making. An MDP is a tuple <S, A, T, R, γ> where S is a finite set of states, A is a finite set of actions, T is a state transition function, R is a reward function and γ is a discount factor.

The technology described herein includes a framework in which the test platform 130 interacts with a plurality of test machines (e.g., 30, 60, 100, 1000) simultaneously to collect trajectories. A trajectory is the sequence of contiguous actions taken through the action space by an agent. Each test machine has an operating system and a product under test (e.g., software version) 126 (e.g., MICROSOFT WORD) pre-installed along with a test agent 127. For example, the agent may open MICROSOFT WORD and start to interact with the MICROSOFT WORD interface. The technology described herein trains the agent to find an efficient path to achieve the target tasks. The agent observes the current state $s_t$ with the environment and receives the reward, and the interface of the application moves to the next state $s_{t+1}$. Each episode terminates when the agent achieves the target reward or reaches the maximum step.

The task-learning problem may be understood as a reinforcement-learning problem by using the Markov decision process. State $s_t$ is represented with the screenshot of the user interface. During each step, the agent observes the visual representation of the interface, and extracts the screenshot of the interface and uploads it to image storage for potential re-use of the data for future training. The use of a visual representation to define a UI state contrasts with using the status of various UI elements to define the UI state. Visual representations have several advantages over UI element representations. For example, visual representations need little or no prepossessing for use in a reinforcement-learning model. In aspects, the visual representation is combined with other information to define a state or task.

Actions include all possible interactive actions with the software interface. In other words, actions may include any action (e.g., select, hover, enter text) a user could perform with an interface element (e.g., button, menu, text box). In one aspect, the actions are determined through interrogation of an accessibility layer (e.g., the Microsoft UI Automation System). The accessibility layer or function framework may be used by applications, like screen readers, for low vision users. The number of available actions for each state is dynamic. Some software applications have a very large action space. For example, some applications may have 100,000 or more actions. During testing, the identified actions may be stored in a key-value store. This storage method may help facilitate use of a parametric action-space model for training the agent.

The transition function T describes the probability of transitioning to the next state $s_{t+1}$ given current state $s_t$. The transition function is determined by the system implemented in a test machine.

A goal is to test functionality as users experience the functionality in applications and in an operating system shell. The reward function may be formulated differently in different experiments. In a first aspect, a positive reward is triggered if the action taken by the agent matches a target action (e.g., when the agent takes the actions of clicking the Bold button or clicking the Font button from the menu).

A first step for training or running the reinforcement-learning model may be to generate a representation of the target task and/or a current state. The representation is then input to the reinforcement-learning model for the model to use to select an action. Different methods of generating a representation are possible, as described with reference to FIG. 4.

Figure 4:
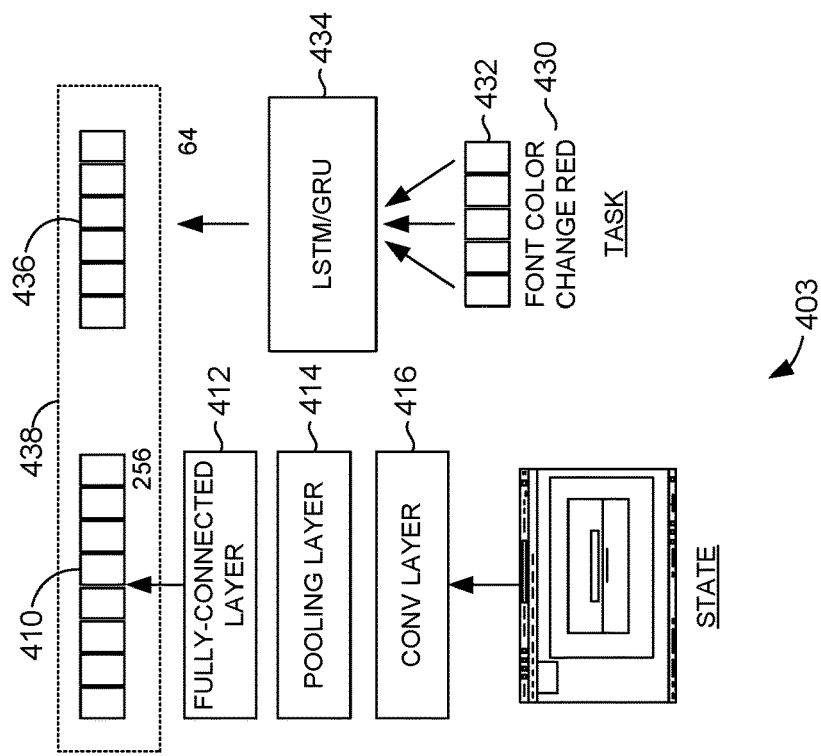
FIG. 4 is a block diagram illustrating different input encoding options, in accordance with aspects of the technology described herein.
Figure 4:
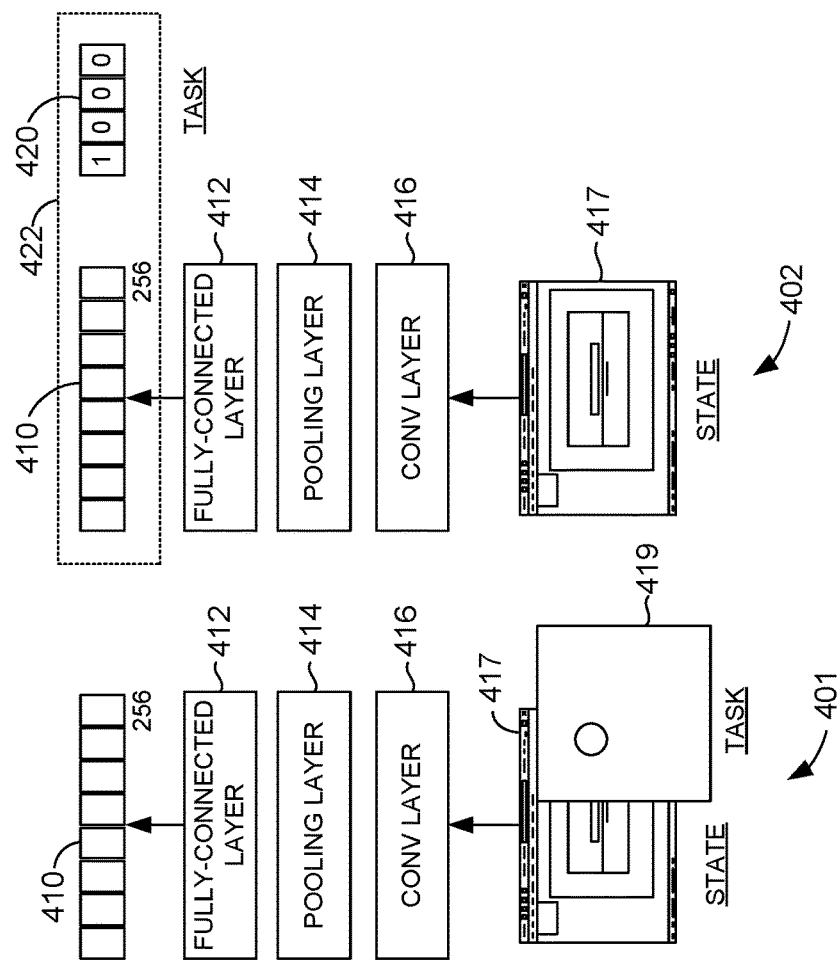

Turning now to FIG. 4, methods of generating task representations are shown. Task representations represent the state associated with a system under test when a task is completed. In other words, the task representation can be a target state. The task representation can be used to determine when a reward should be associated with an action. Conceptually, a reward should be issued when a state produced matches the desired task representation. Each task representation starts with an image of the user interface as it appears after completing a task. In addition, a unique way to represent the specific task is included as input. The unique ways may include a mask image, a one-hot encoding, and/or a natural language task embedding. The unique ways to identify a task may be provided by person directing the reinforcement-learning model training.

The first method 401 of generating a task representation includes an image 417 of the user interface upon task completion along with a mask image 419 that highlights a portion of the user interface closely associated with completing the task. A person directing the training may provide the mask image with the highlighted portion. The image 417 and mask are provided to a convolutional layer 416, followed by a pooling layer 414, and then a fully connected layer 412, which generates the representation 410. The convolutional layer 416, pooling layer 414, and fully connected layer 412 may be trained as part of training a reinforced-learning model. The goal of the training is to cause the layers to emphasize features of the image that best represent the uniqueness of various states. Training of the network is described in more detail subsequently.

The second method 402 concatenates a representation of the UI image 417 with a one-hot encoder value to represent the task 422. One-hot encoding is used as a method to quantify categorical data. In short, this method produces a vector with a length equal to the number of categories in the data set. If a data point belongs to the nth category then components of this vector are assigned the value 0 except for the nth component, which may be assigned a value of 1. Thus, if the reinforcement-learning model is to be trained on four tasks, a first task may be labeled 1, 0, 0, 0, a second task 0, 1, 0, 0, a third task 0, 0, 1, 0, and a fourth task 0, 0, 0, 1. The one-hot encoder value will be unique for each task. The one-hot encoder value may be generated by a one-hot encoder algorithm.

The third method 403 concatenates a representation of the UI image 417 with a task embedding 436 to represent the task 438. A natural language description 430 of the task is encoded 432 and provided to a language model 434, such as a Long Short Term Memory (LSTM) and Gated Recurrent Unit (GRU) model. The language model 434 generates a task embedding 436 of the natural language description. Similar descriptions should receive similar embedding with similar values because the embedding may be based on a language space where words and phrases with similar meaning may be associated with nearby values. The natural language representation is then concatenated with the image representation 410 to form a task representation 438.

Figure 5:
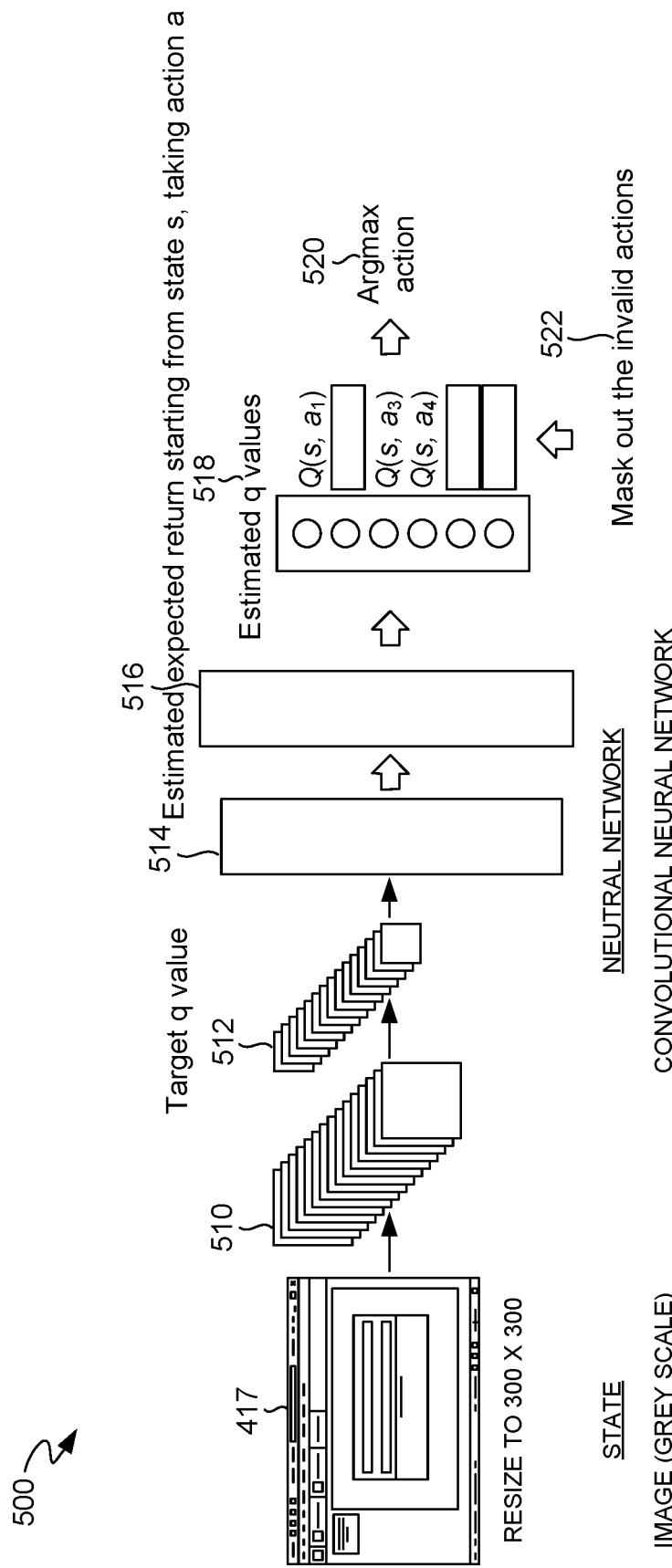
FIG. 5 is a block diagram illustrating a DQN reinforcement-learning model, in accordance with aspects of the technology described herein.

Different architectures can be used with the reinforcement-learning model 140, including a deep Q network (DQN) and a proximal policy optimization (PPO). The DQN model 500 is illustrated in FIG. 5. The DQN model 500 may receive an image 417 of the user interface as input. The image 417 represents the current state of the UI. The image 417 may be fed to a convolutional layer 510 and pooling layer 512 to generate an image representation. The image representation may be processed by a convolutional layer 514. In aspects, the convolutional neural network 514 is trained to identify meaningful user interface features. Meaningful user interface features tend to be uniquely associated with an interface element. For example, if all user interfaces have a blue bar across the top, then the blue bar would not be meaningful. On the other hand, features (e.g., square shape, icon design) of a button or other interactive element can help distinguish one interface from another interface and elements within the interface from other elements within the interface. In one aspect, the convolutional neural network 514 is not updated during training of the reinforcement-learning model. The output layers 516 assign a Q-value to various action state pairs 518. The Q-value is the estimated optimal value of taking the action from the given state. The action with the largest Q value may be selected 520. In other implementations, an action is selected from the top N Q values. This approach adds exploration data by selecting an action that current training suggests is not optimal. If the action determined to be not optimal turns out to be optimal, then the action and associated reward can form valuable training data. The training may occur in batches, through a replay process. In examples, the training observes the reward actually received versus the predicted reward and adjusts network values. The predicted reward may correlate to the Q-value. In aspects, invalid actions 522 may be eliminated before selecting the action based on the Q-value. Invalid actions 522 may be masked. Invalid actions 522 may correspond to actions that are not available in the present user interface.

Figure 6:
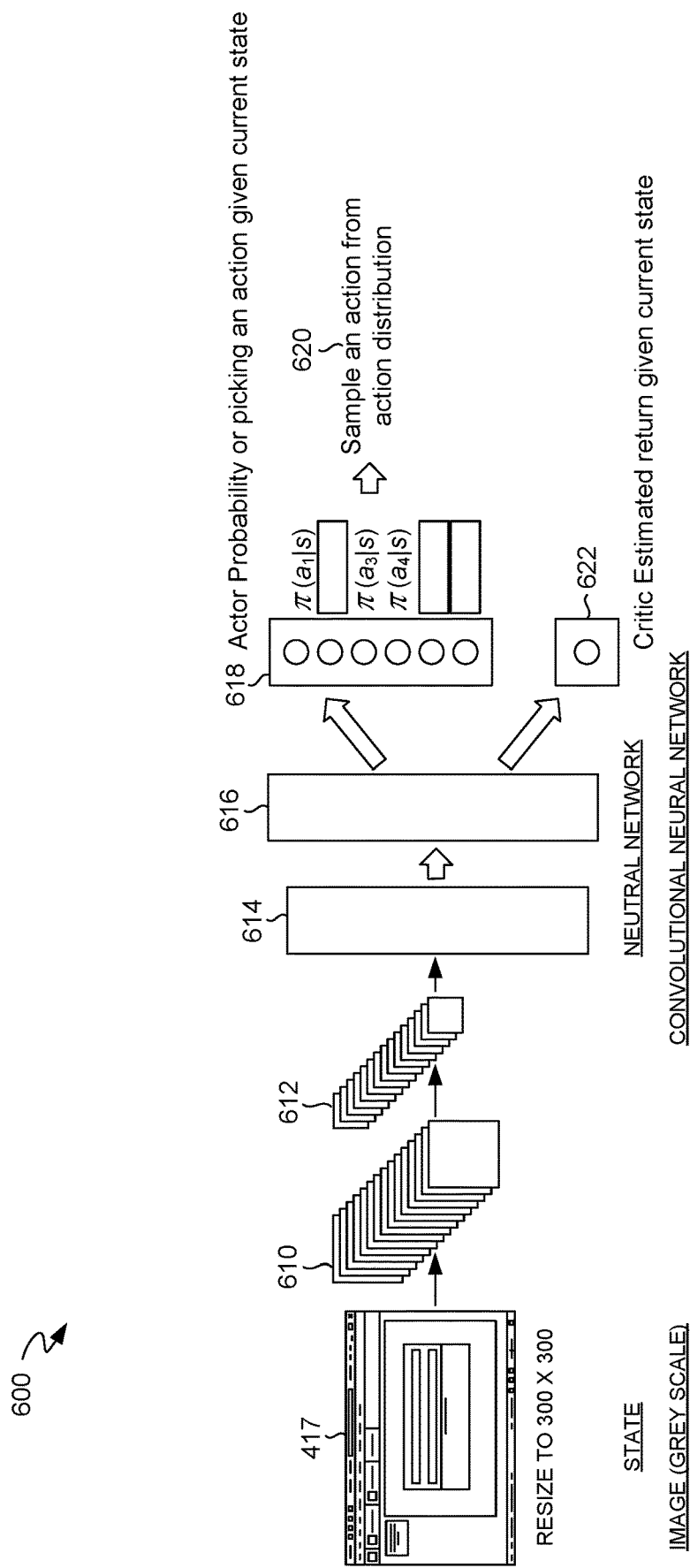
FIG. 6 is a block diagram illustrating a PPO reinforcement-learning model, in accordance with aspects of the technology described herein.

The PPO model 600 is illustrated in FIG. 6. The PPO model 600 may receive an image 417 of the user interface as input. The image 417 represents the current state of the UI. The image 417 may be fed to a convolutional layer 610 and pooling layer 612 to generate an image representation. The image representation may be processed by a convolutional layer 614. In aspects, the convolutional neural network 614 is trained to identify meaningful user interface features. In one aspect, the convolutional neural network 614 is not updated during training of the reinforcement-learning model. The output layers 616 may comprise a critic portion and an actor portion. The actor portion outputs various actions, while the critic calculates an estimated reward. Both receive the same input from the convolutional neural network 614.

A PPO uses policies to select an optimal action. A policy is a mapping from action space to state space. The policy may include instructions for the testing agent 127 to a take an available action from a given state. A goal of training the reinforcement model is to optimize the policy. In aspects, the reinforcement model may take several actions and then perform training on a batch of actions. The actions taken, the estimated reward, and the actual reward may form the training data.

In the UI testing context, the state is a UI, in some examples defined by an image of the UI, and the available actions are those available in the UI. The actor network receives UI images (state data) as the input and outputs a list of probabilities 618, with one probability per action. These probabilities form a distribution, and the action can then be chosen by sampling 620 from this distribution.

To represent the state value function, the critic network also receives the state as the input and outputs a single number representing the estimated state value 622 of that state. The job of the critic model is to learn to evaluate if the action taken by the actor led a better state or not and give its feedback to the actor. The critic outputs a real number indicating a rating (Q-value) of the action taken in the previous state. By comparing this rating obtained from the critic, the actor can compare its current policy with a new policy and decide how it wants to improve itself to take better actions.

The convolutional neural network (CNN) 616 may be modified to include task information in the model through the different task representations described with reference to FIG. 4. With the image encoder representation (method 401), the image encoder may be shaped identically with the screenshot image and concatenated to the screenshot image (e.g., 300×300×1 to 300×300×2) to feed into the CNN 616 without updating the model architecture. With the one-hot ID representation, an array of the one hot representations may be concatenated with the output of the last second layer of the CNN 616 and provided to an additional fully connected layer added prior to the last softmax layer. For the task embedding representation, the one-hot representation of a sequence of words to represent each task may be input, followed by an embedding layer and a GRU layer. The output of the GRU layer may be concatenated with the output of the last second layer of the CNN 616 with another fully connected layer.

The embedding of task and the CNN may be jointly trained. Since there are varying numbers of available actions per state, action masking may be used to provide normalization. In the actor network, a mask may be added to actions that are not interactive for the current state. In one aspect, the available actions in a user interface may be represented by a vector or other data structure. The vector may have enough dimensions to represent all user interface elements in a user interface having the most elements. For example, if the most elements in a user interface is 95, then a vector with 100 dimensions may be used. If another interface includes 20 user interface elements, then the other 80 available dimensions in the vector may be masked.

Returning to FIG. 1, the reinforcement-learning model 140 may be trained through curriculum learning methods. Curriculum learning may be used for software testing as an alternative to or in conjunction with PPO. Curriculum learning (CL) is a learning strategy that learns from easier data then progresses to harder data. The technology described herein may use a naive version of curriculum learning reinforcement learning with the following logic: A number of tasks n may be set up and ordered from easy tasks to a harder task. A list of target rewards may be initialized for each task. The agent may be trained to achieve task 0, which is the easiest task. If the agent completed this task with mean episode reward greater than or equal to the target reward for this task, then the agent is set to train the next task. For example, an easy task may require two consecutive actions to complete. A harder task may require more than two consecutive actions to complete.

The curriculum learning may increase the overall training efficiency. Learning a complex task can be challenging because the rewards will be sparse and the agent will need to take a large number of actions before receiving a positive reward. In contrast, learning an easy task should require performance of fewer actions. Once the reinforcement-learning model has learned an easy task, it may be able to leverage the training received to select better actions while attempting to learn the more complex task. The better actions may mean fewer overall actions are required to learn the more difficult task. Performing fewer actions to achieve the same training is more efficient.

The reinforcement-learning model 140 may be trained to perform tasks. In one aspect, a plurality of workers are used to collect trajectories and one GPU is used for model training. The workers may run on test machines that are separate from the GPU machine. A batch size of 192 may be used in one non-limiting example. The batch includes a series of actions, resulting states, resulting rewards, and estimated rewards. A scheduled decay-learning rate (starting at 1e-4) may be used to train the model. In one aspect, each UI images may be reshaped to 336×336 and grayed out for normalization. To balance exploration and exploitation of PPO, an entropy coefficient scheduler may be used starting at 0.005.

The reinforcement-learning model 140 may be trained to perform multiple tasks. In an example scenario, the agent may be trained to target four tasks in parallel with the three previously described task representation methods. All four tasks may be learned simultaneously when training with the multitask PPO and image encoder representation and task embedding. For one hot task id representation (method 402), the learning may start slower, but catch up to the other methods quickly. Augmenting the RL with the curriculum learning may facilitate learning of more complex tasks, such as entering text and then changing the font color.

The action space mapper 142 uses the action telemetry data and state telemetry data to understand the action space. The technology described herein may start with an undefined action space but begins to learn about the action space through exploration, which is part of the reinforcement learning process. The reinforcement learning process attempts to learn the most efficient procedure for performing a task, but in the learning process the action space is explored. The exploration occurs each time the reinforcement learning process selects a new action to attempt. Whether the action helps complete the task or not, taking the action helps the testing system understand the action space. The exploration may be performed by a plurality of test machines running instances of the software being tested. Each test machine may include a testing agent that performs actions on the software being tested. The testing agent may receive information about the current state of the software as actions are taken during the learning process. In one aspect, the state information is provided by an accessibility function built into the software and/or the operating system running on the test machine. In another aspect, the state information is learned through analysis of an image of the UI. The current state of the software includes user interface elements that can be interacted with from the current state. The current state can also include the type of interaction each component can receive.

The reinforcement-learning model selects an interface element to interact with and, if multiple interaction types are possible, selects an interaction type (e.g., click, double-click, right-click, pen tap, finger touch, multi-touch, voice input, gesture input, camera input). The selection is based on the training received. The selected interaction type is then implemented on the selected interface element to change the state of the software being tested. Both the action taken and the resulting state are communicated to a centralized testing service. The action taken can be described herein in action telemetry data, while the resulting state can be described in state telemetry data. The centralized testing service may then begin to build a model of the action space using the action telemetry data and state telemetry data. The model of the action states can be built by combining telemetry data received from the plurality of test machines conducting the testing.

The simulated training component 143 trains a reinforcement-learning model in a simulated environment. The simulated environment can be built to provide inputs to the reinforcement model with forming content that matches input that will be provided by a live environment into which the reinforcement-learning model is being trained to interact with. Training in a simulated environment is described in more detail with reference to FIGS. 12-16.

The testing director 144 may cause various reinforcement models to perform tasks the models have been trained to learn. In one aspect, a single model can learn multiple tasks. A group of reinforcement models may be used to perform a large group of tasks. The health of the system may be evaluated during performance of the learned tasks. Any unhealthy conditions encountered during task performance may be flagged for investigation and debugging. The testing director 144 may track unhealthy conditions and output these to developers along with the task and/or action step associated with the unhealthy condition.

The testing director 144 may also assign a portion of the testing machines to learn new tasks through reinforcement learning. The learning process can double as a type of exploration of the model space.

The testing director 144 assigns a testing task to various machines. In addition to the reinforcement learning training and task performance by the reinforcement learning models, other types of testing may be performed. In aspects, the testing types may be assigned for a time duration, such as an hour, and then a new testing task may be assigned. The testing on the test machines may be split into different modes. A portion of machines may be allocated to continue random testing, which serves an exploration function. As used herein, random testing can include directed and undirected random testing (e.g., "feedback-directed random test generation" and "adaptive random testing") A second portion of the machines may be allocated to replay testing, which seeks to replay previously identified action scenarios that produce the sought after state. A third portion of machines may be allocated to pioneer testing. Pioneer testing performs random actions, except that the random actions are directed to an undefined portion of the action space. For example, an available user interface element that has not previously been interacted with through the random testing may be selected as a starting point for pioneer testing. Pioneer testing helps ensure coverage for all aspects of a software being tested. In other examples, other types of algorithmic testing and exploration may be used.

Various rules may be used to direct testing resources to different testing modes or different areas of the software. The testing director 144 may evaluate the reward outcome from the past testing and reduce the runtime in the interface areas with no or few unique rewards in the past. This feature saves test machine capacity. The testing director 144 may evaluate rewards specific to the branch under test and tries to focus the capacity to reproduce the rewards specific to that branch. In one aspect, as the number of rewards hit during random exploration decreases, the amount of resources allocated to random exploration are reduced. Similarly, as fewer new action spaces are discovered, the amount of resources allocated to pioneering and/or random exploration are reduced.

The technology described herein utilizes the learned system space to navigate the system effectively while attempting the rewards. The telemetry from the attempts is used to re-evaluate the models and retrain the technology described herein. The technology described herein starts with random exploration and once it learns how to achieve rewards, it optimizes to focus the capacity around hitting rewards.

Figure 2:
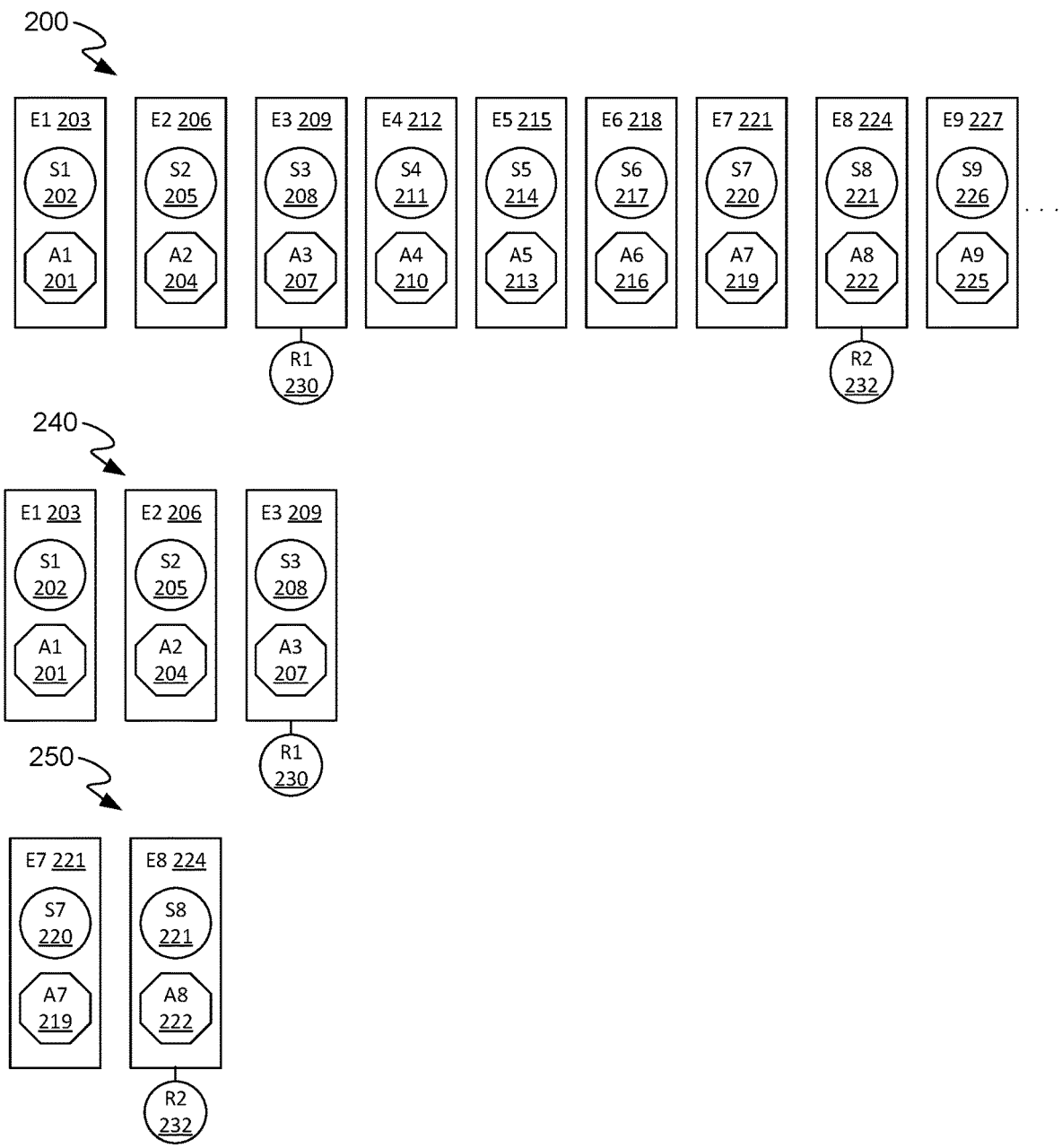
FIG. 2 is a diagram illustrating pattern identification in an event sequence, in accordance with aspects of the technology described herein.

Turning now to FIG. 2, the sequence of events leading to performance of a task and assignment of rewards is illustrated, according to aspects of the technology described herein. As described previously, the test platform 130 of FIG. 1 receives a plurality of action telemetry data and corresponding state telemetry data, which may be an image of the resulting UI. A specific action produces a specific resulting state to form an event. The resulting state is the state of the software being tested directly after the action is taken and before a subsequent action is taken. The state can be defined by an image of the UI. In other aspects, the state is also defined by a collection of software and/or system attributes and corresponding values.

FIG. 2 shows an event sequence 200. The event sequence includes a first event 203, a second event 206, a third event 209, a fourth event 212, a fifth event 215, a sixth event 218, a seventh event 221, an eighth event 224, and a ninth event 227. These nine events may be just nine of hundreds, thousands, or more events recorded during testing.

The first event 203 includes a first action 201 and a first state 202. The first state 201 is the state produced by performing the first action 201. For example, if the first action 201 is selecting a save icon, then the first state 202 could include a displayed "save interface" that was not displayed in the previous state. The second event 206 includes a second action 204 and a second state 205. The third event 209 includes a third action 207 and a third state 208. The third event 209 is also associated with a first reward 230. In aspects, a reward may be assigned to each state with a higher reward associated with sought after state states. In other aspects, a reward is only assigned when a state matches completion of a targeted task within the application, such as saving a file, taking a picture, or any other defined task that may be of particular interest to testers.

The fourth event 212 includes a fourth action 210 and a fourth state 211. The fifth event 215 includes a fifth action 213 and a fifth state 214. The sixth event 218 includes a sixth action 216 and a sixth state 217. The seventh event 221 includes a seventh action 219 a seventh state 220. The eighth event 224 includes an eighth action 222 and an eighth state 221. The eighth event 224 is associated with a second reward 232. The second reward 232 indicates that the eighth state 221 is a sought after state. The ninth event 227 includes a ninth action 225 ninth state 226.

The goal of reinforcement learning is to understand which actions are required to achieve a target state. In this example, a first detected pattern 240 includes the first event 203, the second event 206, and the third event 209. The last event in the detected pattern should be associated with a reward indicating the achievement of a sought after state. A challenge in detecting a sequence of actions that produces the sought after state lies in determining which action starts the sequence. The first detected pattern 240 includes three events, but note the second detected pattern 250 only includes two events and that the fourth event 212, the fifth event 215, and the sixth event 218 were determined to be unrelated to producing the eighth state 221. Instead, only the seventh action 219 and in the eighth action 222 were determined to be required to produce the eighth state 221. The three excluded events (i.e., the fourth through sixth events) may be the result of the testing program pursuing what turned out to be a tangent that did not produce the sought after result. Through training, the reinforcement-learning model learns to only perform the seventh action 219 and in the eighth action 222 when attempting to complete the task associated with the eighth action 222.

Figure 3:
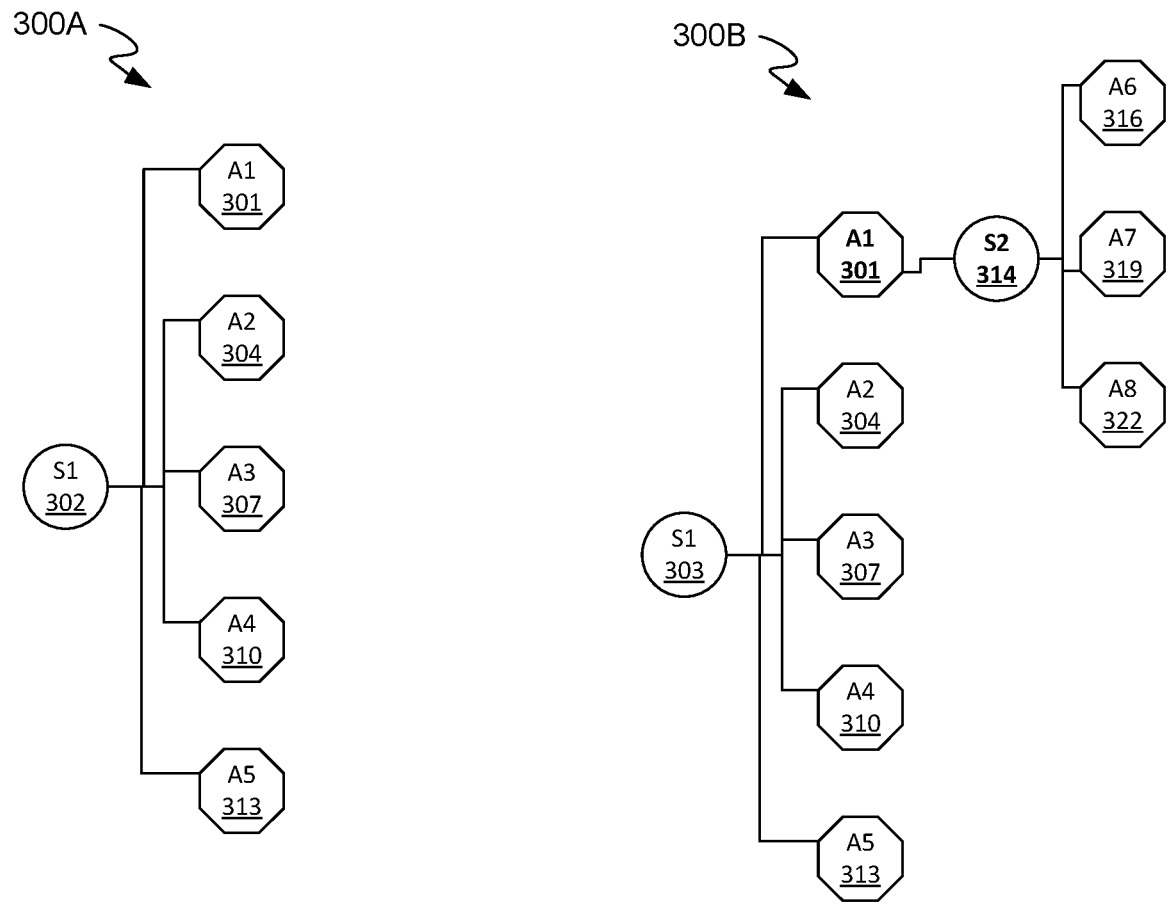
FIG. 3 is a diagram illustrating an undefined action space, in accordance with aspects of the technology described herein.

Turning now to FIG. 3, an undefined action space is illustrated, according to aspects of the technology described herein. The action space is a collection of actions that can be taken from different user interface states available in a software being tested. In a defined action space, all available actions and the resulting states produced by taking the available actions are provided. In undefined space, the actions available from a given state may be determined, but the state produced by taking the actions is unknown.

The action space 300A illustrates an undefined action space. The action space 300A includes a first state 302. The first state 302 to a user interface through which five different actions are possible. These actions include the first action 301, a second action 304, a third action 307, a fourth action 310, and a fifth action 313. Note that the resulting state produced by taking any of these five actions is unknown.

The action space 300B illustrates what happens when the first action 301 is taken. In response to taking the first action 301, a second state 314 is produced. Three additional actions can be taken from the second state 314. These three additional actions include a sixth action 316, seventh action 319, and an eighth action 322. As actions are taken, the technology described herein may build a map of the action space. This is part of the learning process. The action space can be used subsequently during testing to run various scenarios.

Figure 7:
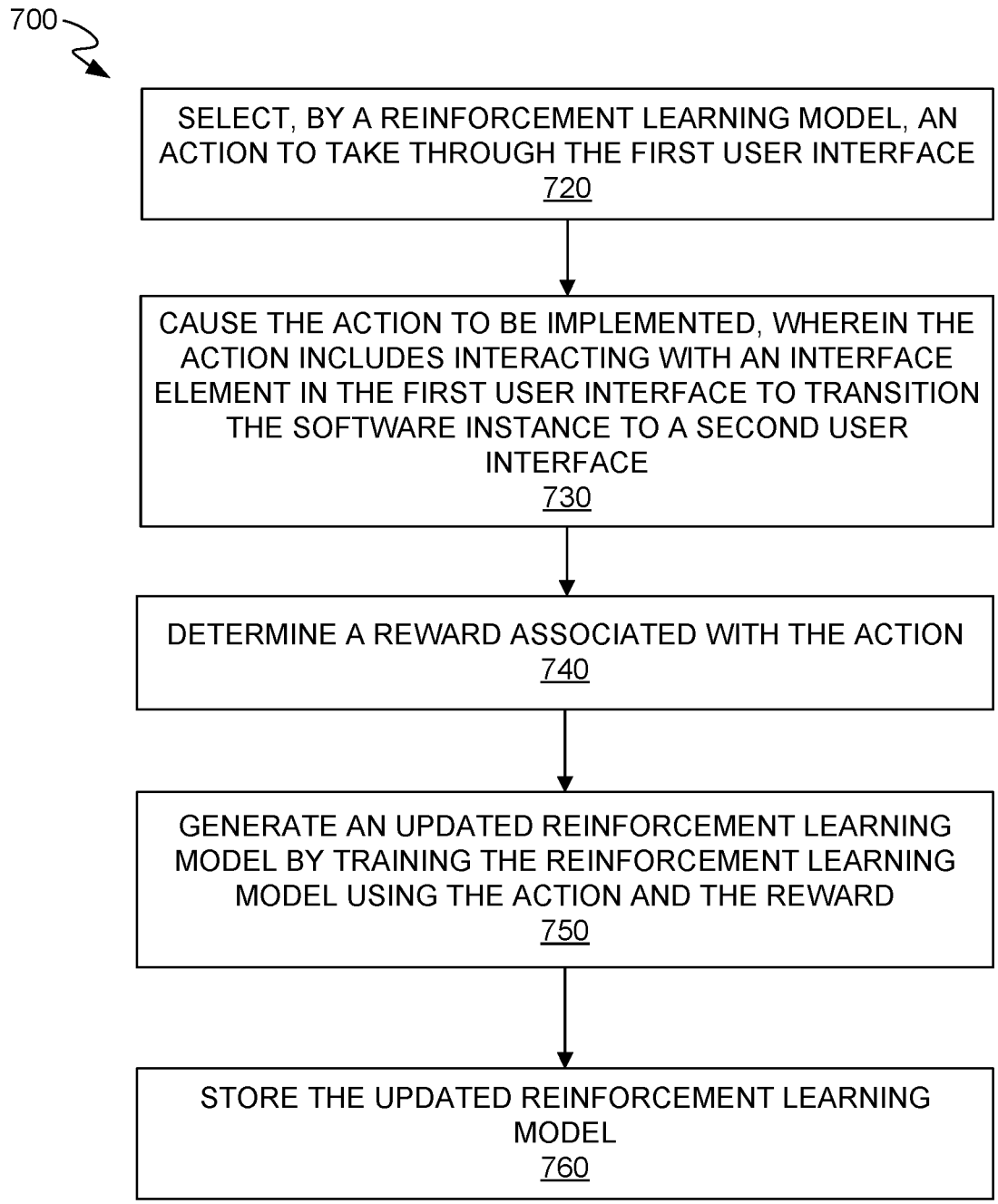
FIG. 7 is a flow chart illustrating a software testing method, in accordance with aspects of the technology described herein.
Figure 8:
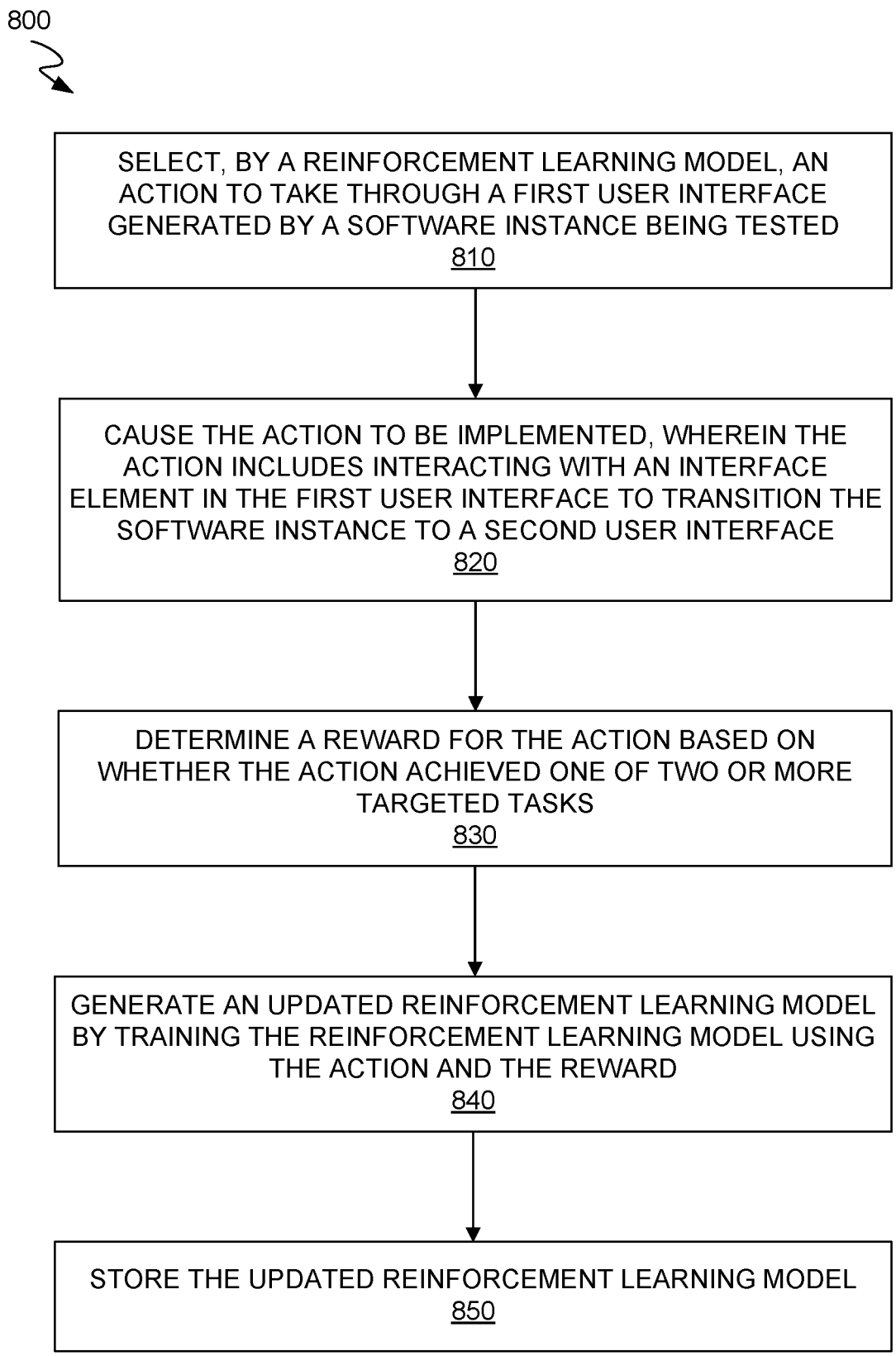
FIG. 8 is a flow chart illustrating a software testing method, in accordance with aspects of the technology described herein.
Figure 9:
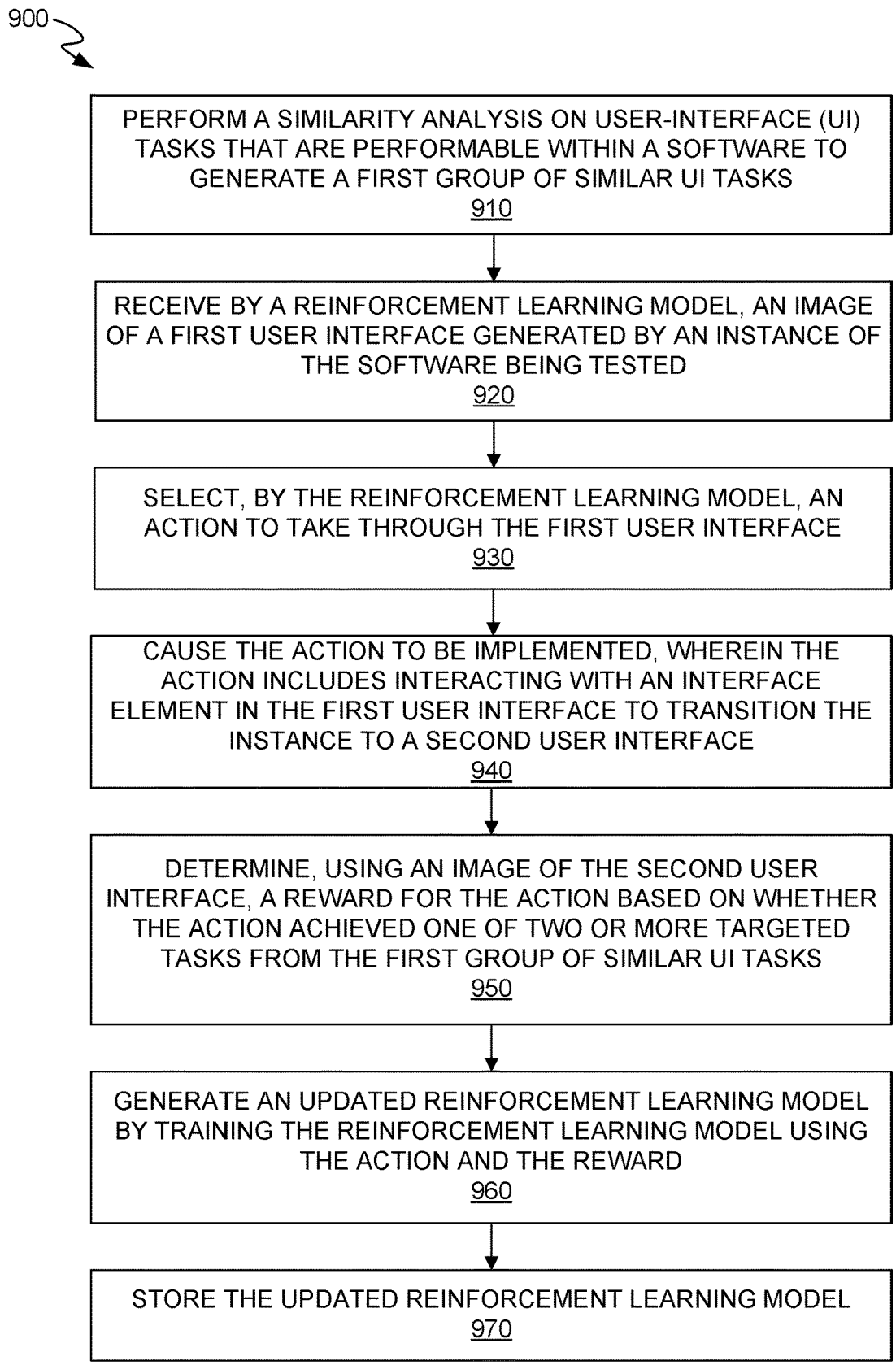
FIG. 9 is a flow chart illustrating a software testing method, in accordance with aspects of the technology described herein.

Now referring to FIGS. 7-9, each block of methods 700, 800, and 900, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be performed by a standalone application, a service or hosted service (standalone or in combination with another hosted service), to name a few. In addition, methods 700, 800, and 900 are described, by way of example, with respect to FIGS. 1-6. However, these methods may additionally or alternatively be executed by any one system, or any combination of systems, including, but not limited to, those described herein.

FIG. 7 describes a method 700 of learning to complete tasks with reinforcement learning, according to an aspect of the technology described herein. Once tasks are learned, the tasks can be completed in a software testing process to determine whether performance of the tasks produces an unhealthy condition in the software and/or system being tested.

Initially, an agent on a test machine may open a software instance being tested to a first user interface. The testing director 144 may specify the user interface to open. In aspects, the first user interface may be a default opening page for the software. For example, using MICROSOFT WORD as an example, the first interface may be the "Home" tab. In other aspects, the first user interface may be selected for testing a specific interface within a software instance. For example, again using MICROSOFT WORD as an example, the first interface may be the "Review" tab.

In aspects, an image of the first user interface may be received by a reinforcement-learning model as an input used to select an action to be taken through the user interface. In aspects, state telemetry data for the first user interface may also be received.

At step 720, the method 700 includes selecting, by a reinforcement-learning model, an action to take through the first user interface. The action selected may be the action estimated to produce the highest reward (e.g., Q value). In other aspects, an exploration function causes the system to select an action with a lower estimated reward. For example, an action may be randomly selected from the actions with the top five estimated rewards. Actions may include all possible interactive actions with the software interface. In other words, actions may be any action (e.g., select, hover, enter text) a user could perform with an interface element (e.g., button, menu, text box).

In one aspect, the actions are determined from analyzing an image of the first user interface. The analysis may identify user interface elements (e.g., button, menu, text box) that can be interacted with. The analysis may also identify the type of interaction (e.g., click, scroll, enter text) that may be possible. In one aspect, the actions are determined through interrogation of an accessibility layer (e.g., the Microsoft UI Automation System).

At step 730, the method 700 includes causing the action to be implemented. Causing the action to be implemented can include communicating an instruction to a testing agent on a test machine. The testing agent can then provide instructions to the software instance being tested. The action may include interacting with an interface element in the first user interface to transition the software instance to a second user interface. When the action is taken, action telemetry data describing the action may be received by a testing platform. The action telemetry data may be received from testing agents running on a plurality of test machines. The action telemetry data includes descriptions of actions (alternatively described simply as "actions") the various testing agents took on the test machines. The action may be taken through an accessibility layer.

In aspects, state telemetry data describing states of the first version of the software at points in time during testing may be received after an action is taken. The state telemetry data may be received from the product under test (i.e., instance of software being tested) on various TMs. The state telemetry data can include new interface elements presented in response to the action along with other changes (e.g., content changes) made to the interface. The state telemetry data can also include system and software health information, such as whether the system crashed, hung, or the like. In aspects, the state telemetry data may take the form of an image of the UI that resulted from an action.

At step 740, the method 700 includes determining a reward associated with the action. The reward may be associated with the state and the action that produced the state. A goal is to test functionality as users experience the functionality in applications and in an operating system shell. The reward function may be formulated differently in different experiments. In a first aspect, a positive reward is triggered if the action by the agent taken matches a target task completion state (e.g., when the agent takes the actions of clicking the Bold button or clicking the Font button from the menu) or achieves a target another state.

At step 750, the method 700 includes generating an updated reinforcement-learning model by training the reinforcement-learning model using the action and the reward. Training may be a batch process that is conducted after a series of actions are taken and corresponding rewards collected. Training a reinforcement-learning model has been described previously with reference to FIGS. 5 and 6. The training method may be tailored to the model architecture.

At step 760, the method 700 includes storing the updated reinforcement-learning model. In aspects, the stored reinforcement-learning model then makes additional interaction choices and receives additional training in response to rewards received. Over time, the reinforcement-learning model may learn to complete one or more tasks. Once learned, the reinforcement-learning model can be used to test a software instance by completing the learned tasks and looking for unhealthy system or software conditions during completion.

FIG. 8 describes a method 800 of learning to complete multiple tasks with reinforcement learning, according to an aspect of the technology described herein. Once tasks are learned, the tasks can be completed in a software testing process to determine whether performance of the tasks produces an unhealthy condition in the software and/or system being tested.

At step 810, the method 800 will select, by a reinforcement-learning model, an action to be taken a first user interface generated by a software instance being tested. The action selected may be the action estimated to produce the highest reward (e.g., Q value). In other aspects, an exploration function causes the system to select an action with a lower estimated reward. For example, an action may be randomly selected from the actions with the top five estimated rewards.

The first user interface may be a default-opening page for the software. For example, using MICROSOFT WORD as an example, the first interface may be the "Home" tab. In other aspects, the first user interface may be selected for testing a specific area of a software instance. For example, again using MICROSOFT WORD as an example, the first interface may be the "Review" tab.

Actions may include all possible interactive actions with the software interface. In other words, actions may be any action (e.g., select, hover, enter text) a user could perform with an interface element (e.g., button, menu, text box). In one aspect, the actions are determined from analyzing an image of the first user interface. The analysis may identify user interface elements (e.g., button, menu, text box) that can be interacted with. The analysis may also identify the type of interaction (e.g., click, scroll, enter text) that may be possible. In one aspect, the actions are determined through interrogation of an accessibility layer (e.g., the Microsoft UI Automation System).

At step 820, the method 800 will cause the action to be implemented. Causing the action to be implemented can include the testing director 144 communicating an instruction to a testing agent on a test machine. The testing agent can then provide instructions to the software instance being tested. The action includes interacting with an interface element in the first user interface to transition the software instance to a second user interface. When the action is taken, action telemetry data describing the action may be received by a testing platform. The action telemetry data may be received from testing agents running on a plurality of test machines. The action telemetry data includes descriptions of actions (alternatively described simply as "actions") the various testing agents took on the test machines. The action may be taken through an accessibility layer.

At step 830, the method 800 will determine a reward for the action based on whether the action achieved one of two or more targeted tasks. The reward may be associated with the state and the action that produced the state. A goal is to test functionality as users experience the functionality in applications and in an operating system shell. The reward function may be formulated differently in different experiments. In a first aspect, a positive reward is triggered if the action by the agent taken matches a target task completion state (e.g., when the agent takes the actions of clicking the Bold button or clicking the Font button from the menu) or achieves a target another state.

At step 840, the method 800 will generate an updated reinforcement-learning model by training the reinforcement-learning model using the action and the reward. Training may be a batch process that is conducted after a series of actions are taken and corresponding rewards collected. Training a reinforcement-learning model has been described previously with reference to FIGS. 5 and 6. The training method may be tailored to the model architecture. In an aspect, the reinforcement-learning model is trained on multiple tasks. In one aspect, the training is a serial process where a first task is trained, then a second task, and so on. In aspects, the first task may be the easiest to learn and the last task the most complex. The complexity may be measured in an amount of sequential actions need to complete the task.

At step 850, the method 800 will store the updated reinforcement-learning model. In aspects, the stored reinforcement-learning model then makes additional interaction choices and the agent may cause the interactions to be implemented. The reinforcement-learning model receives additional training in response to rewards associated with the additional interactions. Eventually, the reinforcement-learning model may learn to complete one or more tasks. Once learned, the reinforcement-learning model can be used to test a software instance by completing the learned tasks and looking for unhealthy system or software conditions during completion.

FIG. 9 describes a method 900 of testing software, according to an aspect of the technology described herein. Once tasks are learned, the tasks can be completed in a software testing process to determine whether performance of the tasks produces an unhealthy condition in the software and/or system being tested.

At step 910, the method 900 includes performing a similarity analysis on UI tasks that are performable within a software to generate a first group of similar UI tasks. The technology described herein may train a reinforcement-learning model to perform multiple tasks. When training a reinforcement-learning model on multiple tasks, performance may be enhanced by training the model to perform similar tasks. Similar tasks may have one or more common steps. For example, tasks performed from the same menu may include opening the menu.

There are multiple ways to determine similarity. For example, the image of the interface upon achieving a target state may be compared to images of the interface upon achieving a different target state. Visual similarity methods may be used to measure the difference between images. These methods include root mean square error (RMSE), peak signal-to-noise ratio (PSNR), structural similarity index (SSIM), and feature-based similarity index (FSIM).

In an aspect, language encoding of a task description is used to determine similarity. In this method, "change font color to red" should be similar to "change font color to blue."

At step 920, the method 900 includes receiving, by a reinforcement-learning model, an image of a first user interface generated by an instance of the software being tested. In aspects, state telemetry data for the first user interface may also be provided.

At step 930, the method 900 includes selecting, by the reinforcement-learning model, an action to take through the first user interface. The action selected may be the action estimated to produce the highest reward (e.g., Q value). In other aspects, an exploration function causes the system to select an action with a lower estimated reward. For example, an action may be randomly selected from the actions with the top five estimated rewards.

Actions may include all possible interactive actions with the software interface. In other words, actions may be any action (e.g., select, hover, enter text) a user could perform with an interface element (e.g., button, menu, text box). In one aspect, the actions are determined from analyzing an image of the first user interface. The analysis may identify user interface elements (e.g., button, menu, text box) that can be interacted with. The analysis may also identify the type of interaction (e.g., click, scroll, enter text) that may be possible. In one aspect, the actions are determined through interrogation of an accessibility layer (e.g., the Microsoft UI Automation System).

At step 940, the method 900 includes causing the action to be implemented. Causing the action to be implemented can include communicating an instruction to a testing agent on a test machine. The testing agent can then provide instructions to the software instance being tested. Where the action includes interacting with an interface element in the first user interface to transition the instance to a second user interface. When the action is taken, action telemetry data describing the action may be provided to a testing platform. The action telemetry data may be received from testing agents running on a plurality of test machines. The action telemetry data includes descriptions of actions (alternatively described simply as "actions") the various testing agents took on the test machines. The action may be taken through an accessibility layer.

At step 950, the method 900 includes determining, using an image of the second user interface, a reward for the action based on whether the action achieved one of two or more targeted tasks from the first group of similar UI tasks. In this case, the reward is based on whether one of several different tasks was achieved. In this way, multiple actions and resulting states could receive a reward. In an aspect, completion of each task is associated with a reward.

At step 960, the method 900 includes generating an updated reinforcement-learning model by training the reinforcement-learning model using the action and the reward. Training may be a batch process that is conducted after a series of actions are taken and corresponding rewards collected. Training a reinforcement-learning model has been described previously with reference to FIGS. 5 and 6. The training method may be tailored to the model architecture.

At step 970, the method 900 includes storing the updated reinforcement-learning model. In aspects, the stored reinforcement-learning model then makes additional interaction choices and receives additional training in response to rewards received. Over time, the reinforcement-learning model may learn to complete one or more tasks. Once learned, the reinforcement-learning model can be used to test a software instance by completing the learned tasks and looking for unhealthy system or software conditions during completion.

Example Distributed Computing Environment

Figure 10:
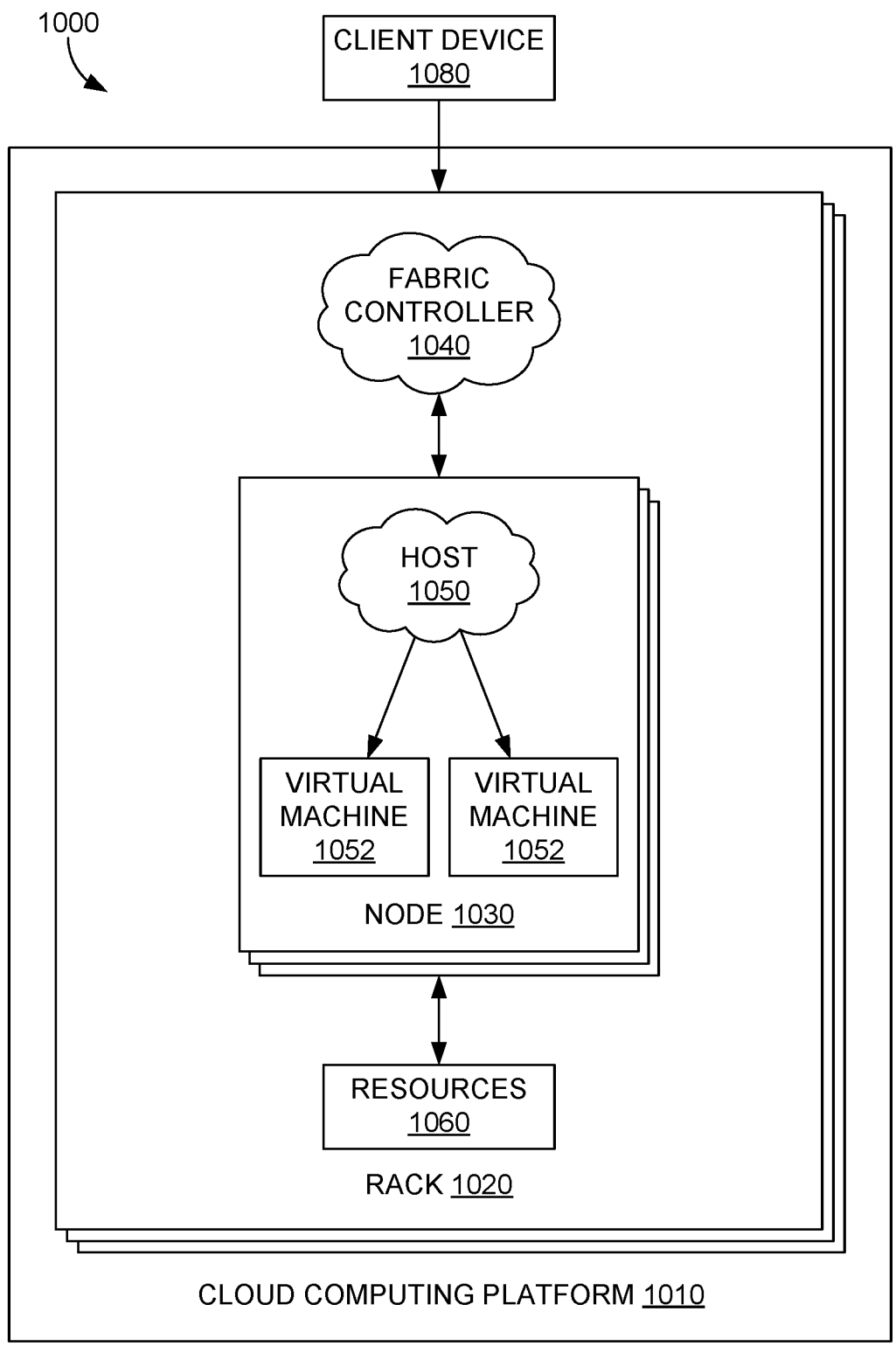
FIG. 10 is a block diagram of an example distributed computing environment suitable for use in implementing aspects of the technology described herein.

Referring now to FIG. 10, FIG. 10 illustrates an example distributed computing environment 1000 in which implementations of the present disclosure may be employed. Data centers can support distributed computing environment 1000 that includes cloud computing platform 1010, rack 1020, and node 1030 (e.g., computing devices, processing units, or blades) in rack 1020. The system can be implemented with cloud computing platform 1010 that runs cloud services across different data centers and geographic regions. Cloud computing platform 1010 can implement fabric controller 1040 component for provisioning and managing resource allocation, deployment, upgrade, and management of cloud services. Typically, cloud-computing platform 1010 acts to store data or run service applications in a distributed manner. Cloud computing infrastructure 1010 in a data center can be configured to host and support operation of endpoints of a particular service application. Cloud computing infrastructure 1010 may be a public cloud, a private cloud, or a dedicated cloud.

Node 1030 can be provisioned with host 1050 (e.g., operating system or runtime environment) running a defined software stack on node 1030. Node 1030 can also be configured to perform specialized functionality (e.g., compute nodes or storage nodes) within cloud computing platform 1010. Node 1030 is allocated to run one or more portions of a service application of a tenant. A tenant can refer to a customer utilizing resources of cloud computing platform 1010. Service application components of cloud computing platform 1010 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 1030, nodes 1030 may be partitioned into test machines (e.g., test machine 1052 and test machine 1054). Physical machines can also concurrently run separate service applications. The test machines or physical machines can be configured as individualized computing environments that are supported by resources 1060 (e.g., hardware resources and software resources) in cloud computing platform 1010. It is contemplated that resources can be configured for specific service applications. Further, each service application may be divided into functional portions such that each functional portion is able to run on a separate test machine. In cloud computing platform 1010, multiple servers may be used to run service applications and perform data storage operations in a cluster. In particular, the servers may perform data operations independently but exposed as a single device referred to as a cluster. Each server in the cluster can be implemented as a node.

Client device 1080 may be linked to a service application in cloud computing platform 1010. Client device 1080 may be any type of computing device, which may correspond to computing device 1000 described with reference to FIG. 10, for example. Client device 1080 can be configured to issue commands to cloud computing platform 1010. In embodiments, client device 1080 may communicate with service applications through a virtual Internet Protocol (IP) and load balancer or other means that direct communication requests to designated endpoints in cloud computing platform 1010. The components of cloud computing platform 1010 may communicate with each other over a network (not shown), which may include, without limitation, one or more local area networks (LANs) and/or wide area networks (WANs).

Example Computing Environment

Having briefly described an overview of embodiments of the present invention, an exemplary operating environment in which embodiments of the present invention may be implemented is described below in order to provide a general context for various aspects of the present invention. Referring initially to FIG. 11 in particular, an exemplary operating environment for implementing embodiments of the present invention is shown and designated generally as computing device 1100. Computing device 1100 is but one example of a suitable computing environment and is not intended to suggest any limitation as to the scope of use or functionality of the invention. Neither should computing device 1100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 11:
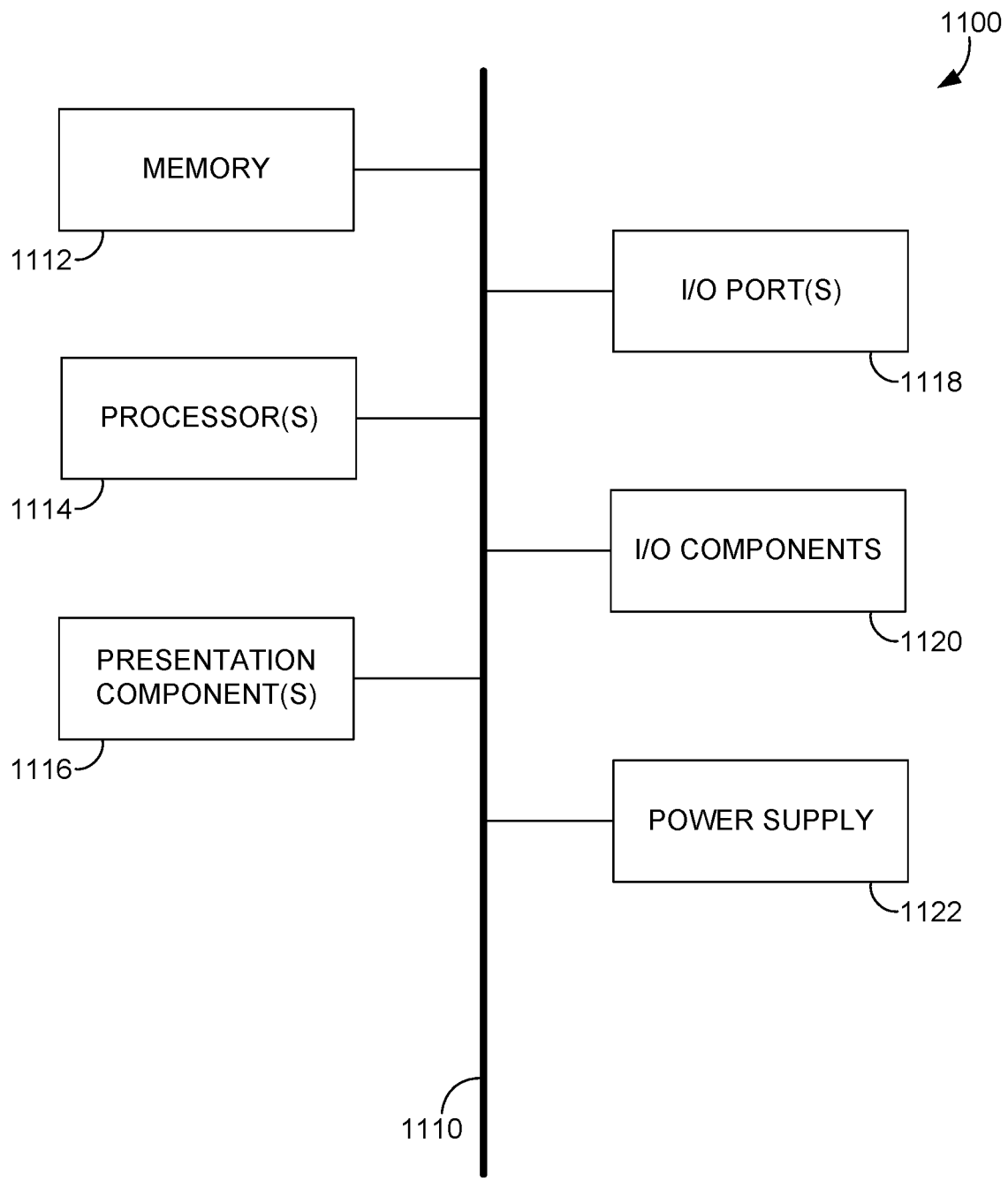
FIG. 11 is a block diagram of an example computing environment suitable for use in implementing aspects of the technology described herein.

With reference to FIG. 11, computing device 1100 includes bus 1110 that directly or indirectly couples the following devices: memory 1112, one or more processors 1114, one or more presentation components 1116, input/output ports 1118, input/output components 1120, and illustrative power supply 1122. Bus 1110 represents what may be one or more buses (such as an address bus, data bus, or combination thereof). The various blocks of FIG. 11 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc.

Simulated Environment for Reinforcement-Learning Model Training

Figure 12:
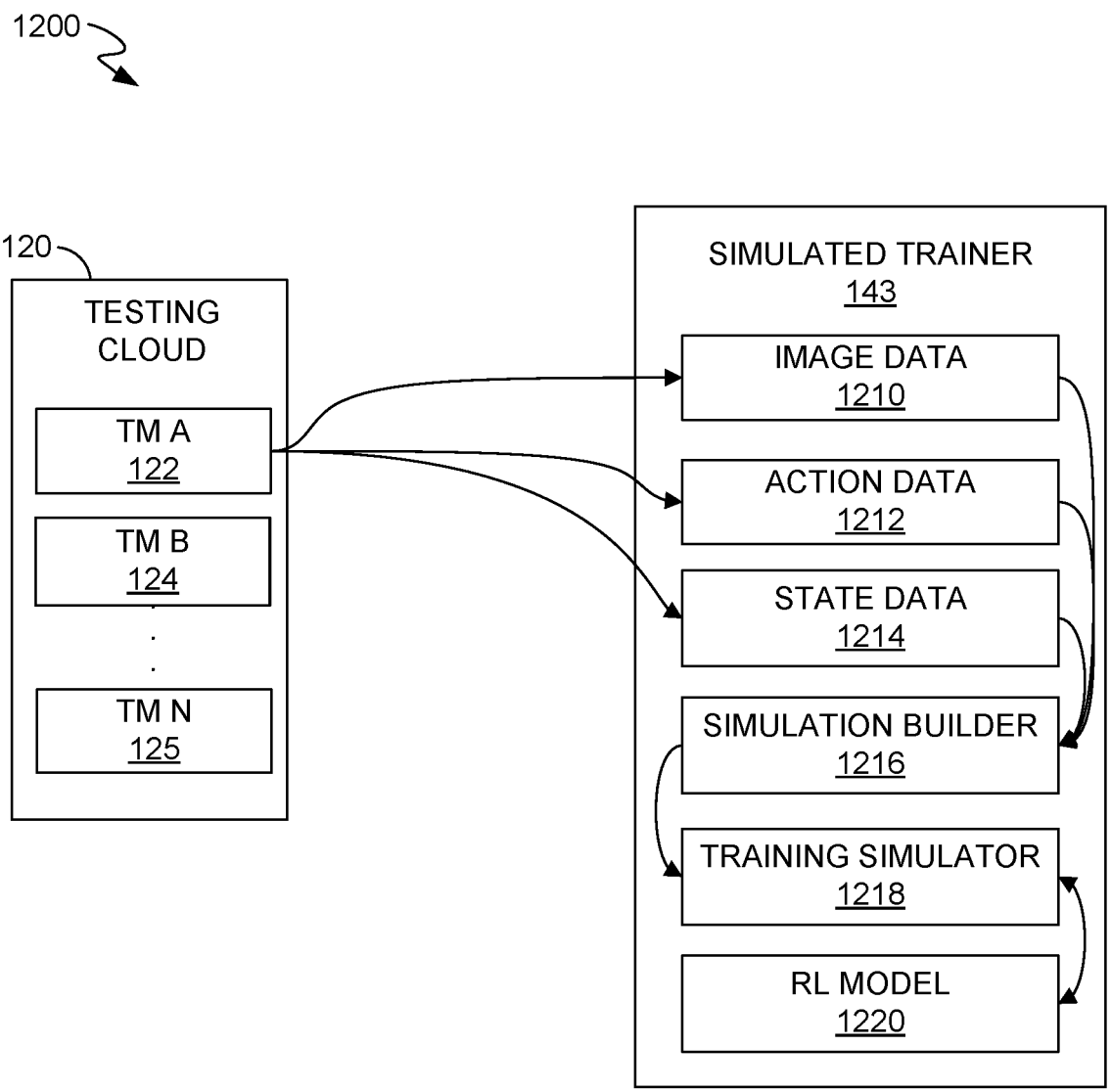
FIG. 12 is a block diagram of a simulated training environment, in accordance with aspects of the technology described herein.

Turning now to FIG. 12, an environment 1200 for training a reinforcement-learning model in a simulated environment is provided, in accordance with aspects of the technology described herein. The environment 1200 includes the testing cloud 120 and a simulated trainer 143. Both of these components have been described previously with reference to FIG. 1. As described previously, the testing cloud 120 is a live testing environment with test machines with test agents interact with a software instance to detect bugs or other unhealthy conditions. The test machines may be running a reinforcement-learning model to perform the testing, as described previously with reference to FIG. 1. Other testing technology, such as a random walk, may also be used. In an aspect, images are collected when a sequence of actions are determined to accomplish a task and the determination is associated with a confidence factor above a designated threshold.

When conducting the software testing, the test agent navigates through the user interface of the software instance by taking actions available through a live, active user interface. In aspects, an image of each user interface is collected and communicated to the image data store 1210. Similarly, each action taken may be communicated to the action-telemetry data store 1212. Finally, the state telemetry data collected at each user interface may be communicated to the state-telemetry data store 1214. The data provided may be timestamped to allow for correlation between actions and resulting states, including images of the resulting states.

The data from the image data store 1210, the action-telemetry data store 1212, and the state telemetry data store 1214 may be combined by the simulation builder 1216 into a simulated action model, such as simulated action model 1300 described with reference to FIG. 13. The simulated action model links simulated user interfaces together through actions that would cause a live instance of the software to transition from one user interface to the next in response to the action. For example, a simulated first user interface may be linked to a simulated second user interface through a simulated "click the bold button" action. The simulated second user interface would reflect any changes made to the live first user interface in response to clicking the bold button. The simulation is reproduced based on the testing machine taking these actions (e.g., clicking the bold button in the first user interface) and providing data describing the live first user interface, the action taken, and the live second user interface.

In aspects, the simulated action model and overall simulation environment may not be able to simulate every possible action within the corresponding live environment. The simulated action model may be incomplete when the interaction data is incomplete. The interaction data may be incomplete when testing applications that produce the interaction data have not taken every possible action from every possible state within the software. As testing begins on a new software or new version of software, the interaction data will be incomplete. As testing continues, the interaction data may eventually be completed.

The training simulator 1218 presents the simulated environment to the reinforcement-learning model 1220. The training simulator 1218 may present a single simulated user interface at a time to the reinforcement-learning model 1220 in the same format used by the reinforcement-learning model in a live environment. In an aspect, the format may include an image of the user interface that is the same size and resolution as would be used in a live environment. Also, the format may include state telemetry data presented in the same format as would be presented in a live environment. The reinforcement-learning model 1220 may receive this data and select an action to take from available actions within the state telemetry data. The action is fed back to the training simulator 1218. The training simulator 1218 then presents a simulated user interface that would result from taking the selected action in the live environment. A reward may be assigned to the action based on the resulting state and the reward in combination with the action can be used to retrain the reinforcement-learning model 1220. Once trained in the simulated environment, the reinforcement-learning model 1220 could be deployed as the reinforcement-learning model 140 in a live testing environment.

Figure 13:
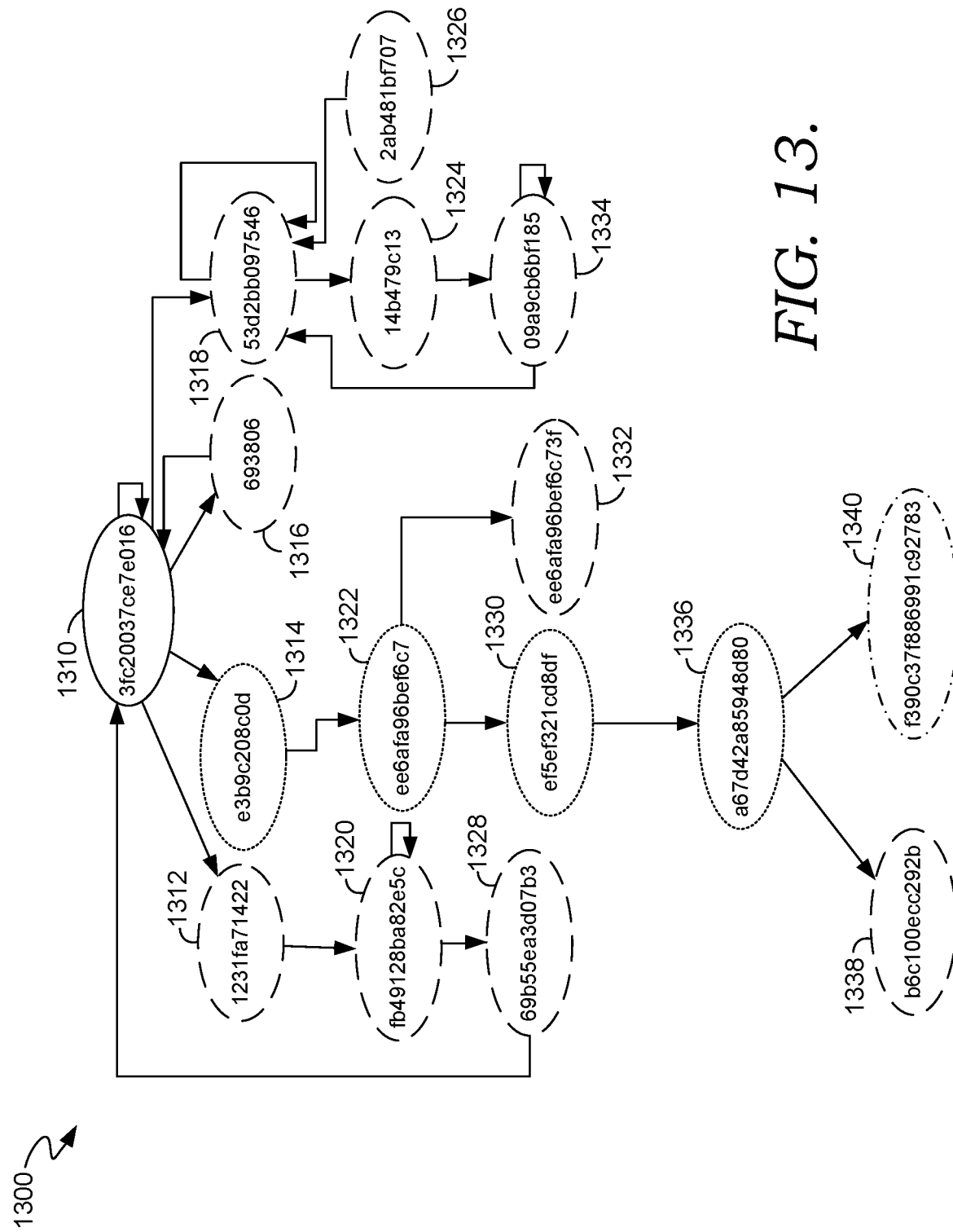
FIG. 13 is a block diagram of a simulated action space, in accordance with aspects of the technology described herein.

Turning now to FIG. 13, a simulated action model 1300 is provided, in accordance with aspects of the technology described herein. The simulated action model 1300 represents user interfaces as nodes connected by edges. The edges represent specific interactions with a user-interface element, such as a button, text box, menu, and the like. The arrows indicate that the user interface pointed to may be generated by interacting with the user interface-element within a user interface connected to the beginning of the arrow. The user interfaces represented within the simulated action model 1300 include a simulated first user interface 1310. Interactions with the simulated first user interface 1310 can produce the simulated second user interface 1312, the simulated third user interface 1314, the simulated fourth user interface 1316, or the simulated fifth user interface 1318. An interaction with the simulated second user interface 1312 may produce the simulated sixth user interface 1320. An interaction with the simulated sixth user interface 1320 may produce the simulated tenth user interface 1328. An interaction with the simulated tenth user interface 1328 may produce the simulated first user interface 1310.

Interaction with the simulated third user interface 1314 may produce the simulated seventh user interface 1322. Interactions with the simulated seventh user interface 1322 may produce the simulated $11^{th}$ user interface 1330 or the simulated $12^{th}$ user interface 1332. An interaction with the simulated fourth user interface 1316 may produce the simulated first user interface 1310. An interaction with the simulated fifth user interface 1318 may produce the simulated eighth user interface 1324. An interaction with the simulated eighth user interface 1324 may produce the simulated $13^{th}$ user interface 1334. An interaction with the simulated $13^{th}$ user interface 1334 may produce the simulated fifth user interface 1318. An interaction with the simulated ninth user interface 1326 may produce the simulated fifth user interface 1318. An interaction with the simulated $11^{th}$ user interface 1330 may produce the simulated $13^{th}$ user interface 1336. Interactions with the simulated $13^{th}$ user interface 1336 may produce the simulated $14^{th}$ user interface 1338 or the simulated $15^{th}$ user interface 1340.

The simulated action model 1300 may be used to generate a simulated environment for training a reinforcement-learning model. For example, the same characteristics of a first user interface that would be presented to a reinforcement-learning model in a live environment may be retrieved from the simulated action model 1300 and presented to a reinforcement-learning model as part of a simulation. The characteristics may be stored in the simulated action model 1300 and retrieved as the simulation proceeds to imitate navigation through the simulated action model 1300. The characteristics of the first user interface 1310 may include an image of the first user interface and state telemetry data for the simulated first user interface. The state telemetry data may include a description of user interface elements that may be interacted with through the simulated first user interface. The state telemetry data may also include the type of interaction (e.g., click, hover) that a user interface element may receive.

As can be seen, the state telemetry data for the simulated first user interface 1310 may indicate four different user interface elements are available. During the simulation, the state telemetry data will be provided to a reinforcement-learning model. The reinforcement-learning model processes the state telemetry data to choose among the available actions. As mentioned, the action may include the user-interface element interacted with and the corresponding interaction type (e.g., click, double-click, right-click, pen tap, finger touch, multi-touch, voice input, gesture input, camera input). The reinforcement-learning model selects an action and submits the selected action back to the simulation. A reward is assigned to the selected action provided. The reinforcement-learning model is then provided with the simulated third user interface 1314. The process will then repeat with new state telemetry data provided, a new action selected and a new reward provided.

In this example, completing a task may be represented by achieving the target user interface 1340. Completing the task may be associated with a corresponding reward to be used when training the reinforcement-learning model. As can be seen, completing the task may require selecting an appropriate interaction within the simulated first user interface 1310, the simulated third user interface 1314, the simulated seventh user interface 1322, the simulated $11^{th}$ user interface 1330, and the simulated $13^{th}$ user interface 1336. The reinforcement-learning model that is interacting with the simulated environment can then be trained based on the action data, state telemetry data, and reward data provided by the simulated environment during the simulation.

Figure 14:
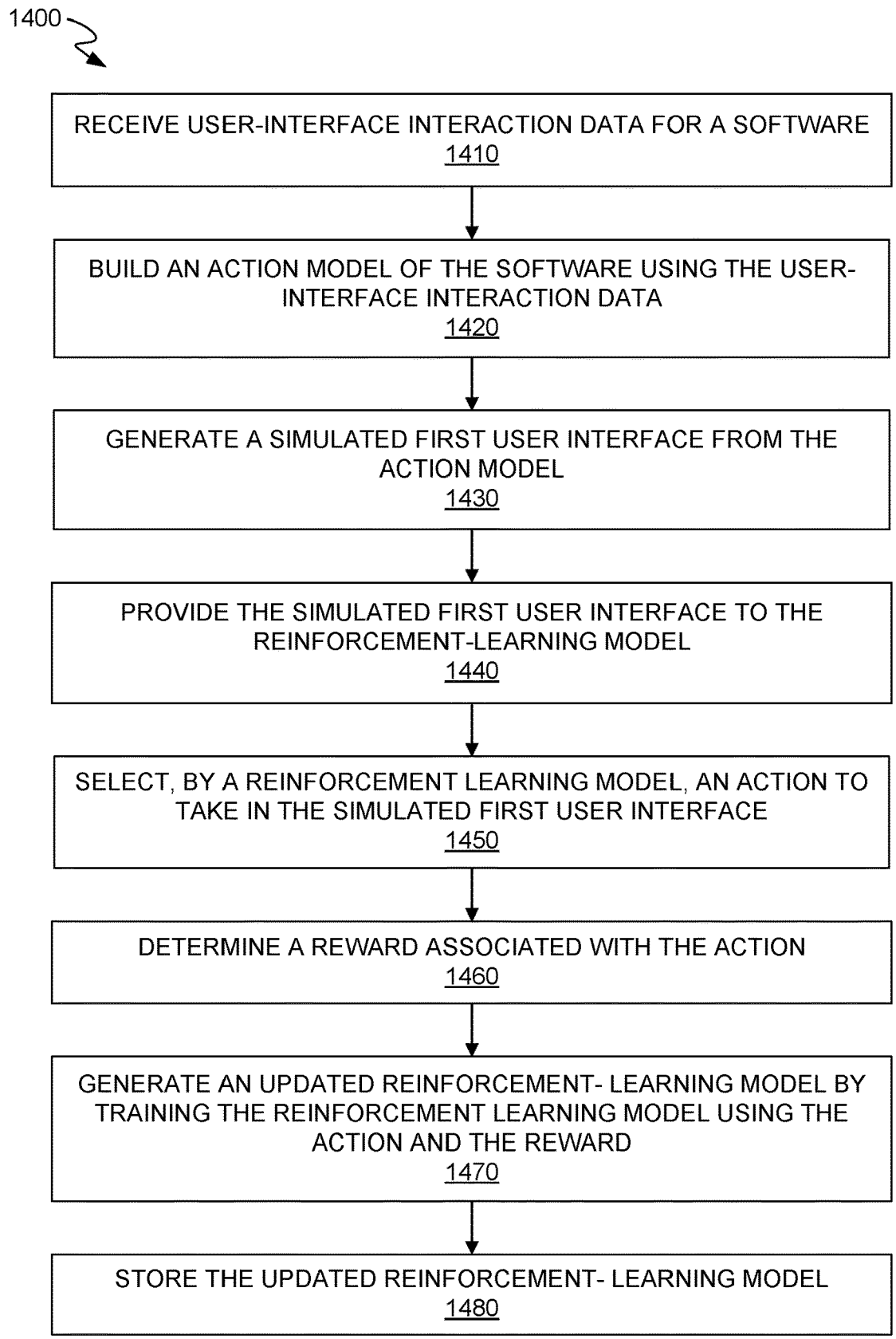
FIG. 14 is a flow chart illustrating a simulated training method, in accordance with aspects of the technology described herein.
Figure 15:
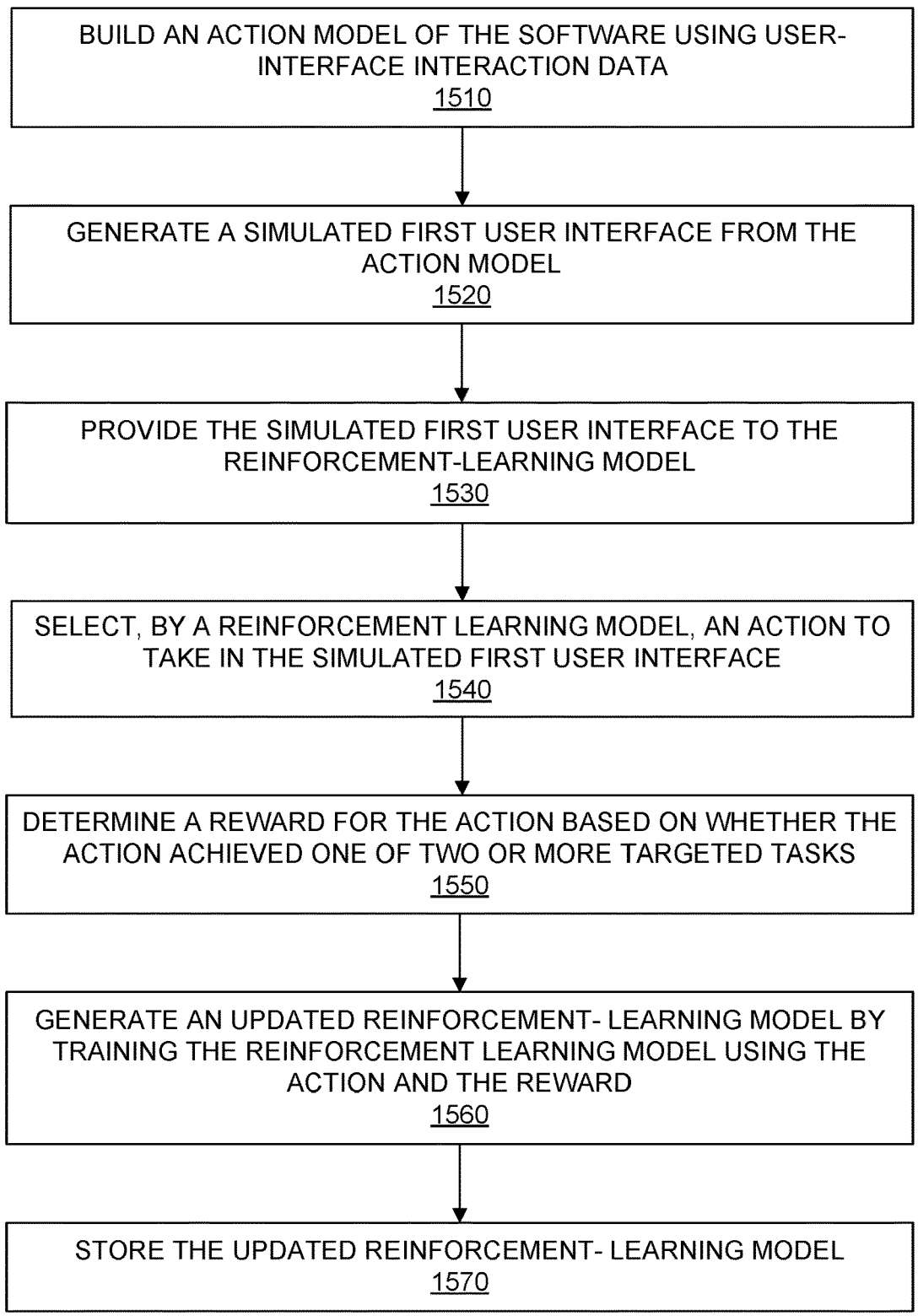
FIG. 15 is a flow chart illustrating a simulated training method, in accordance with aspects of the technology described herein.
Figure 16:
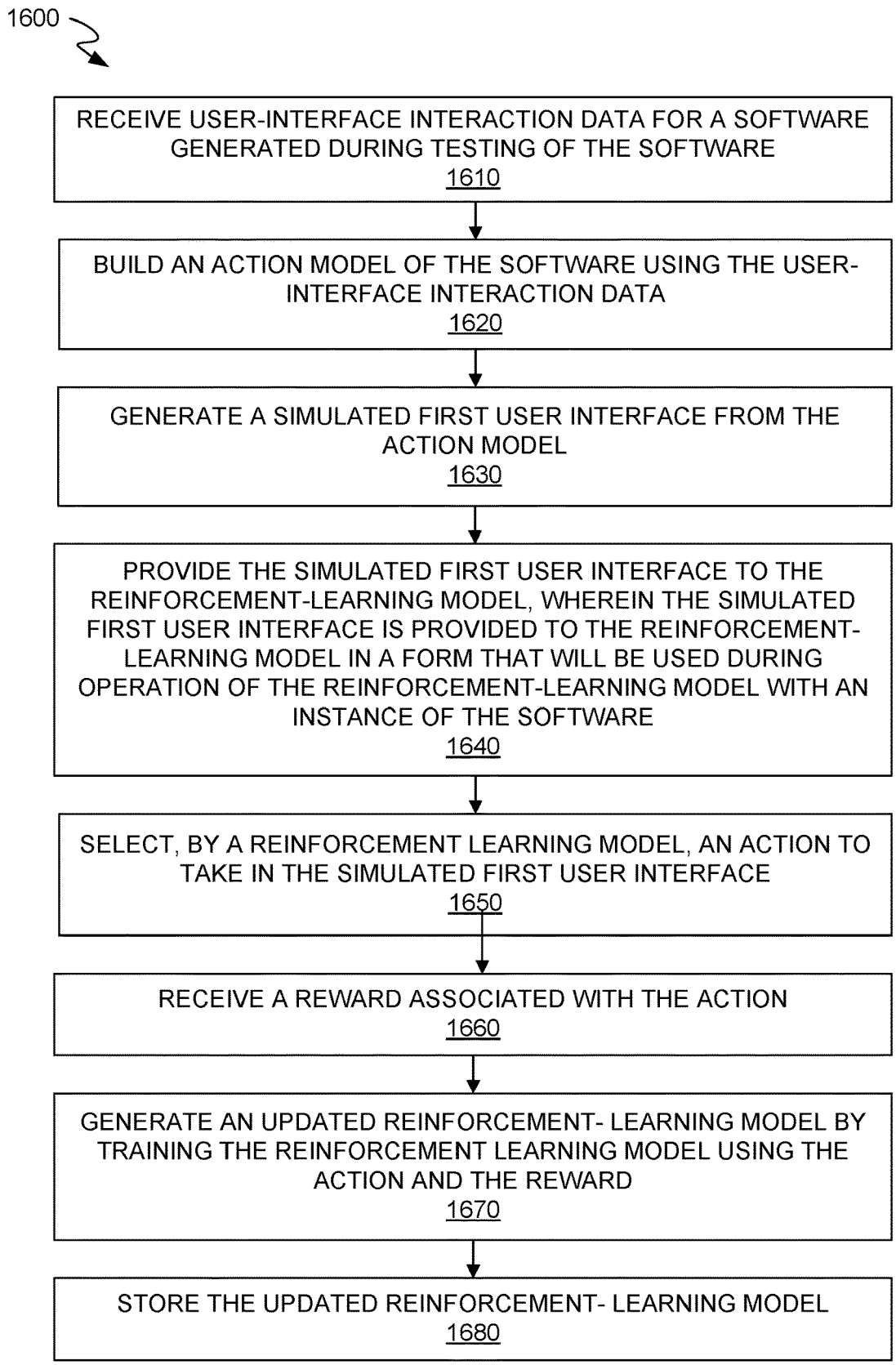
FIG. 16 is a flow chart illustrating a simulated training method, in accordance with aspects of the technology described herein.

Now referring to FIGS. 14-16, each block of methods 1400, 1500, and 1600, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be provided by a standalone application, a service or hosted service (standalone or in combination with another hosted service), to name a few. In addition, methods 1400, 1500, and 1600 are described, by way of example, with respect to FIGS. 1-13. However, these methods may additionally or alternatively be executed by any one system, or any combination of systems, including, but not limited to, those described herein.

FIG. 14 describes a method 1400 of simulated training for a reinforcement-learning model, according to an aspect of the technology described herein. Once tasks are learned, the tasks can be completed in a software testing process to determine whether performance of the tasks produces an unhealthy condition in the software and/or system being tested.

At step 1410, the method 1400 includes receiving user-interface interaction data for a software. The user-interface interactions that are used to build the simulated action model may be performed and recorded by an automated system, such as a software testing system performing playback or exploration testing of a software instance in a live environment. The automated system may include a reinforcement-learning model, but also may include other types of systems. For example, a random walk system may explore the live environment and learn how to perform tasks. The random walk process may record state telemetry and action telemetry that may be used to build the simulated action model.

At step 1420, the method 1400 includes building an action model of the software using the user-interface interaction data. The simulated action model may represent user interfaces as nodes connected by edges. The edges represent a specific interaction with the user-interface element, such as a button, text box, menu, and the like. The action model links user interfaces through actions available in the user interfaces. This allows the reinforcement-learning model to select an available action in a simulated first user interface and be presented with a simulated second user interface that would result from the action.

At step 1430, the method 1400 includes generating a simulated first user interface from the action model. In the simulation, the simulated first user interface may be represented by state telemetry data and an image of the simulated first user interface. The simulated first user interface corresponds to a live user interface in a live instance of the software. The live user interface was encountered previously in a live environment where the image of the live user interface was recorded along with corresponding state information.

At step 1440, the method 1400 includes providing the simulated first user interface to the reinforcement-learning model. As mentioned, providing the simulated first user interface may include providing the state telemetry data and an image of the simulated first user interface in the same format used within the live environment to present a user interface.

At step 1450, the method 1400 includes selecting, by the reinforcement-learning model, an action to take in the simulated first user interface. The reinforcement-learning model will select among available actions, which may be indicated in the state telemetry data associated with the simulated first user interface.

At step 1460, the method 1400 includes determining a reward associated with the action. The reward is based on whether a task was accomplished with the action. Rewards are preprogrammed into the reinforcement-learning model. Rewards represent what the reinforcement-learning model is being trained to perform. In aspects, a reward of +5 may be assigned when a task is accomplished while reward of −0.1 is assigned when the task is not accomplished. In aspects, the weighting of positive and negative rewards may be based on reward sparsity. For example, if negative rewards are more likely to be issued than positive rewards, the positive rewards may weighted more heavily.

At step 1470, the method 1400 includes generating an updated reinforcement-learning model by training the reinforcement-learning model using the action and the reward. In aspects, the training can be done in batches.

At step 1480, the method 1400 includes storing the updated reinforcement-learning model. Once trained, the updated reinforcement-learning model could be trained further in a simulated environment or deployed in a live environment.

FIG. 15 describes a method 1500 of simulated training for a reinforcement-learning model, according to an aspect of the technology described herein. Once tasks are learned, the tasks can be completed in a software testing process to determine whether performance of the tasks produces an unhealthy condition in the software and/or system being tested.

At step 1510, the method 1500 includes building an action model of a software using user-interface interaction data. The simulated action model may represent user interfaces as nodes connected by edges. The edges represent a specific interaction with the user-interface element, such as a button, text box, menu, and the like. The action model links user interfaces through actions available in the user interfaces. This allows the reinforcement-learning model to select an available action in a simulated first user interface and be presented with a simulated second user interface that would result from the action.

At step 1520, the method 1500 includes generating a simulated first user interface from the action model. In the simulation, the simulated first user interface may be represented by state telemetry data and an image of the simulated first user interface. The simulated first user interface will correspond to a live user interface in a live instance of the software. The actual user interface was encountered previously in a live environment where the image of the live user interface was recorded along with corresponding state information.

At step 1530, the method 1500 includes providing the simulated first user interface to a reinforcement-learning model. The simulated first user interface is provided to the reinforcement-learning model in a form that will be used by the reinforcement learning model during operation of the reinforcement-learning model with an instance of the software.

At step 1540, the method 1500 includes selecting, by the reinforcement-learning model, an action to take in the simulated first user interface. The selected action may be the action with the best probability of producing a reward (e.g., highest Q score). The selected action may also allow for exploration by selecting an action with less than the best probability of producing a reward. Instead of the best probability, the action may be selected arbitrarily from a subset of the actions, e.g., the actions with the five or ten highest probabilities.

At step 1550, the method 1500 includes determining a reward for the action based on whether the action achieved one of two or more targeted tasks. Two or more rewards are available when the reinforcement-learning model is being taught to perform two or more tasks. A reward may be associated with completing any of the tasks.

At step 1560, the method 1500 includes generating an updated reinforcement-learning model by training the reinforcement-learning model using the action and the reward.

At step 1570, the method 1500 includes storing the updated reinforcement-learning model. Once trained, the updated reinforcement-learning model could be trained further in a simulated environment or deployed in a live environment.

FIG. 16 describes a method 1600 of simulated training for a reinforcement-learning model, according to an aspect of the technology described herein. Once tasks are learned, the tasks can be completed in a software testing process to determine whether performance of the tasks produces an unhealthy condition in the software and/or system being tested.

At step 1610, the method 1600 includes receiving user-interface interaction data for a software generated during testing of the software.

At step 1620, the method 1600 includes building an action model of the software using the user-interface interaction data. The simulated action model may represent user interfaces as nodes connected by edges. The edges represent a specific interaction with the user-interface element, such as a button, text box, menu, and the like. The action model links user interfaces through actions available in the user interfaces. This allows the reinforcement-learning model to select an available action in a simulated first user interface and be presented with a simulated second user interface that would result from the action.

At step 1630, the method 1600 includes generating a simulated first user interface from the action model. In the simulation, the simulated first user interface may be represented by state telemetry data and an image of the simulated first user interface. The simulated first user interface corresponds to a live user interface in a live instance of the software. The live user interface was encountered previously in a live environment where the image of the actual user interface was recorded along with corresponding state information.

At step 1640, the method 1600 includes providing the simulated first user interface to a reinforcement-learning model. The simulated first user interface is provided to the reinforcement-learning model in a form that will be used by the reinforcement-learning model during operation of the reinforcement-learning model with an instance of the software.

At step 1650, the method 1600 includes selecting, by the reinforcement-learning model, an action to take in the simulated first user interface. The selected action may be the action with the best probability of producing a reward (e.g., highest Q score). The selected action may also allow for exploration by selecting an action with less than the best probability of producing a reward. Instead of the best probability, the action may be selected arbitrarily from a subset of the actions, e.g., the actions with the five or ten highest probabilities.

At step 1660, the method 1600 includes receiving a reward associated with the action.

At step 1670, the method 1600 includes generating an updated reinforcement-learning model by training the reinforcement-learning model using the action and the reward.

At step 1680, the method 1600 includes storing the updated reinforcement-learning model. Once trained, the updated reinforcement-learning model could be trained further in a simulated environment or deployed in a live environment.

Cloud Architecture For Reinforcement Learning

Figure 17:
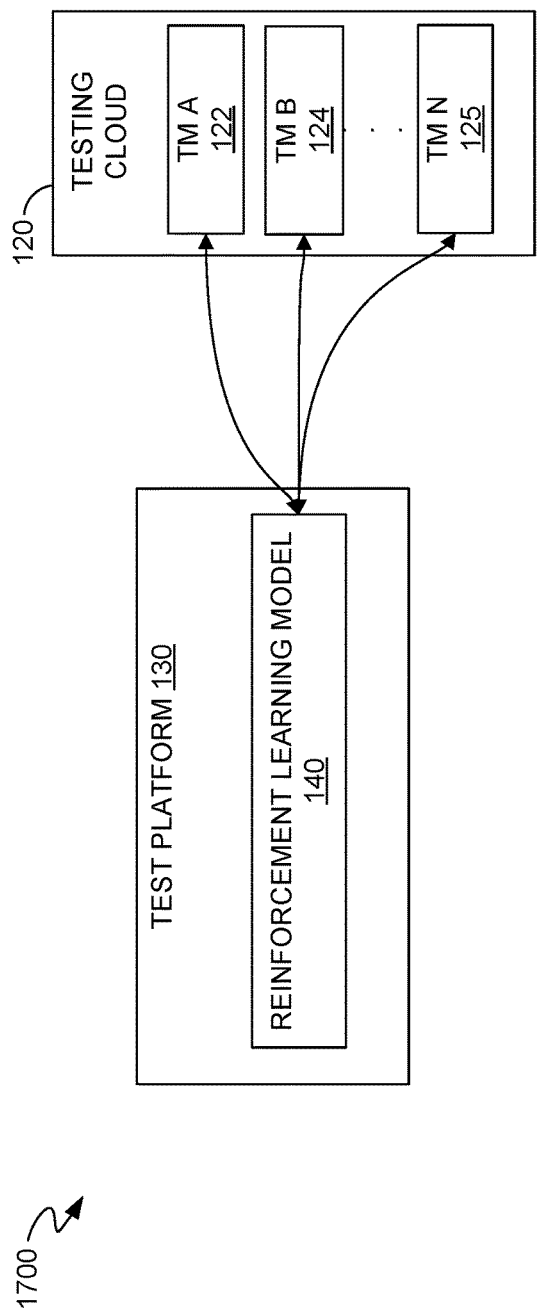
FIG. 17 is a block diagram of a cloud architecture environment suitable for reinforcement learning, in accordance with aspects of the technology described herein.

Turning now to FIG. 17, an exemplary cloud-architecture for reinforcement learning 1700 is shown, according to an aspect of the technology described herein. The cloud-architecture for reinforcement learning 1700 allows a single reinforcement-learning model to interact with multiple live software environments. FIG. 17 is a cloud implementation of the environment described in FIG. 1. The software-testing environment 100 of FIG. 1 may be implemented in the cloud using the architecture described with reference to FIGS. 17 and 18. However, the software-testing environment 100 is not limited to the implementations described with reference to FIGS. 17 and 18.

Among other components not shown, the cloud-architecture for reinforcement learning 1700 includes a testing cloud 120 with test machine A 122, test machine B 124, and test machine N 125, and test platform 130, all connected by a computer network. It should be understood that this and other arrangements described herein are set forth only as examples. The test platform 130 includes a reinforcement-learning model 140. The lines running between the reinforcement-learning model 140 and the various test machines illustrate that the reinforcement-learning model 140 is interacting with all three machines shown. Implementations of the technology described herein are not limited to use with three machines. The interactions may be going on more or less contemporaneously. For example, the reinforcement-learning model 140 may instruct the first test machine to perform a first action and then repeat the process for each of the other test machines, or a subset thereof. Each of the test machines may perform the selected action and provide a result back to the reinforcement-learning model 140.

The cloud-architecture for reinforcement learning 1700 allows a single reinforcement-learning model to interact with multiple live software environments. Though only a single reinforcement-learning model is shown, the cloud-architecture for reinforcement learning is capable of hosting multiple reinforcement-learning models that may each interact with a group of live environments. In an aspect, each reinforcement-learning model could be trained to learn different tasks using its dedicated group of test machines to provide live environments. The live software environments and the reinforcement-learning model 140 run in a distributed computing environment (e.g., cloud environment). The reinforcement-learning model 140 may run on a first computing device(s) with a GPU to aid in training the single reinforcement-learning model. The first computing devices(s) may include a head node(s) and a group of workers. The multiple live software environments may be provided by virtual machines running on a different computing device(s), which may not have a GPU.

At a high level, the reinforcement-learning model 140 may receive state telemetry data from the multiple live environments on the test machines. Each live environment may include a test agent and a software instance undergoing testing. The multiple live environments may each be testing the same software. Thus, each live environment may include a different instance of the same software. The state telemetry data may include an image of an active user interface. The state telemetry data may also include a description of user interface elements that may be interacted with through the active user interface. The state telemetry data may be different for each live environment.

The reinforcement-learning model 140 selects an available action for each set of state telemetry data received and communicates the selection to appropriate the test agent. The test agent then facilitates completion of the action within the software instance being tested in the live environment. A reward is then determined for the action. The reward is based on whether the action completed a task. In this way, the reinforcement-learning model 140 can explore multiple live environments in parallel. The combined interactions are then used to train the reinforcement-learning model 140.

Figure 18:
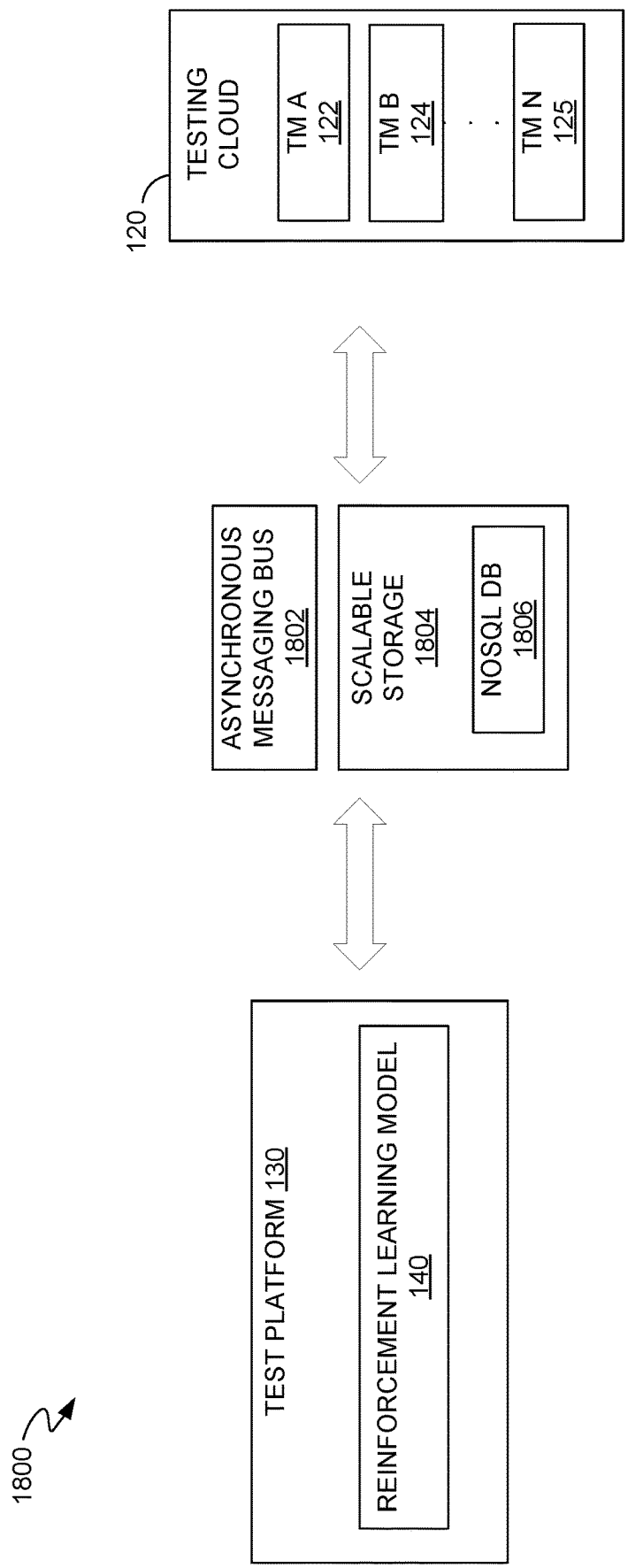
FIG. 18 is a block diagram of a cloud architecture environment suitable for reinforcement learning, in accordance with aspects of the technology described herein.

FIG. 18 shows additional architectural details for the exemplary cloud-architecture environment for reinforcement learning 1800 is shown, according to an aspect of the technology described herein. The environment 1800 can include an asynchronous messaging bus 1802, scalable storage 1804, and a NoSQL database 1806.

The asynchronous messaging bus 1802 is responsible for managing communications between the test platform 130 and the testing cloud 120. The asynchronous messaging bus 1802 may provide asynchronous messaging through queues. Asynchronous messaging helps the cloud architecture manage component availability. Not all components may always be available to receive a message. For example, the reinforcement-learning model 140 may be in the process of selecting an action for a first test machine when it receives state data (e.g., selection input) from a second test machine requesting selection of an action for the second test machine. In this example, the reinforcement-learning model 140 may continue to make the first selection while the message from the second test machine is held in a queue within the asynchronous messaging bus 1802. The asynchronous messaging may not be needed if a single reinforcement-learning model is interacting with a single live environment. In the one-on-one environment, direct messaging through an API may be sufficient.

The scalable storage 1804 may be used to store user interface images, action telemetry data, rewards, state telemetry data, and/or other data. The scalable storage 1804 may be characterized as a data pool or other cloud storage system. The scalable storage 1804 may add memory capacity as the reinforcement-learning model 140 interacts with the live environments. During training of the reinforcement-learning model 140, the stored data may be provided to the reinforcement-learning model 140.

The NoSQL database 1806 may store the action telemetry data among other types of data. NoSQL databases (aka "not only SQL") are non-tabular databases and store data differently than relational tables. NoSQL databases come in a variety of types based on their data model. The main types are document, key-value, wide-column, and graph. In aspects, the NoSQL 1806 is a key-value database. A key-value database is a type of nonrelational database that uses a simple key-value method to store data. A key-value database stores data as a collection of key-value pairs in which a key serves as a unique identifier. Both keys and values can be anything, ranging from simple objects to complex compound objects. The key-value data store can be an efficient way to store the action telemetry data, which can vary greatly in size from user interface to user interface. Among other reasons, the size may vary because different user interfaces may have a different amount of user interface elements.

Figure 19:
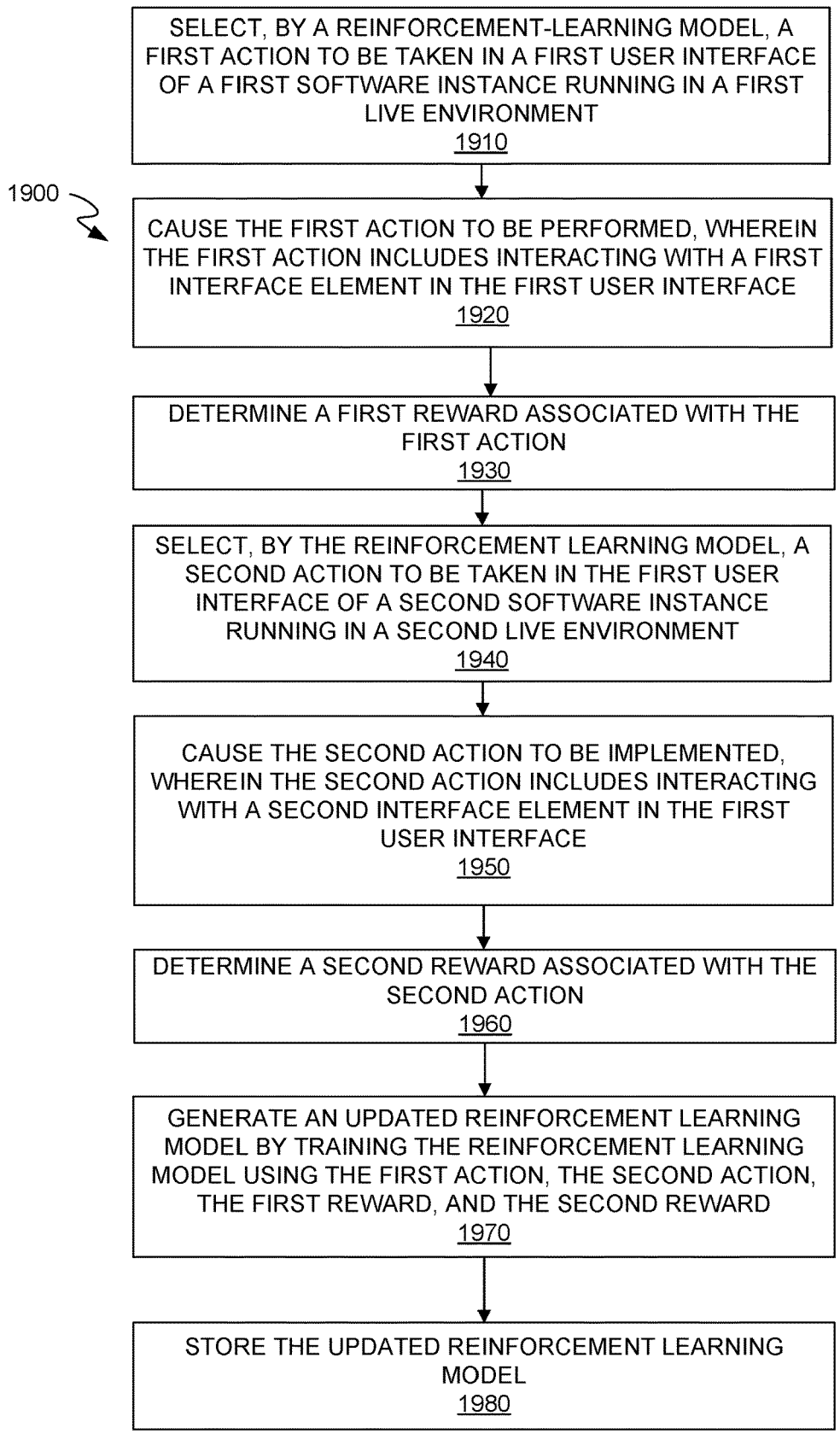
FIG. 19 is a flow chart illustrating use of a reinforcement-learning model in a cloud architecture, in accordance with aspects of the technology described herein.
Figure 20:
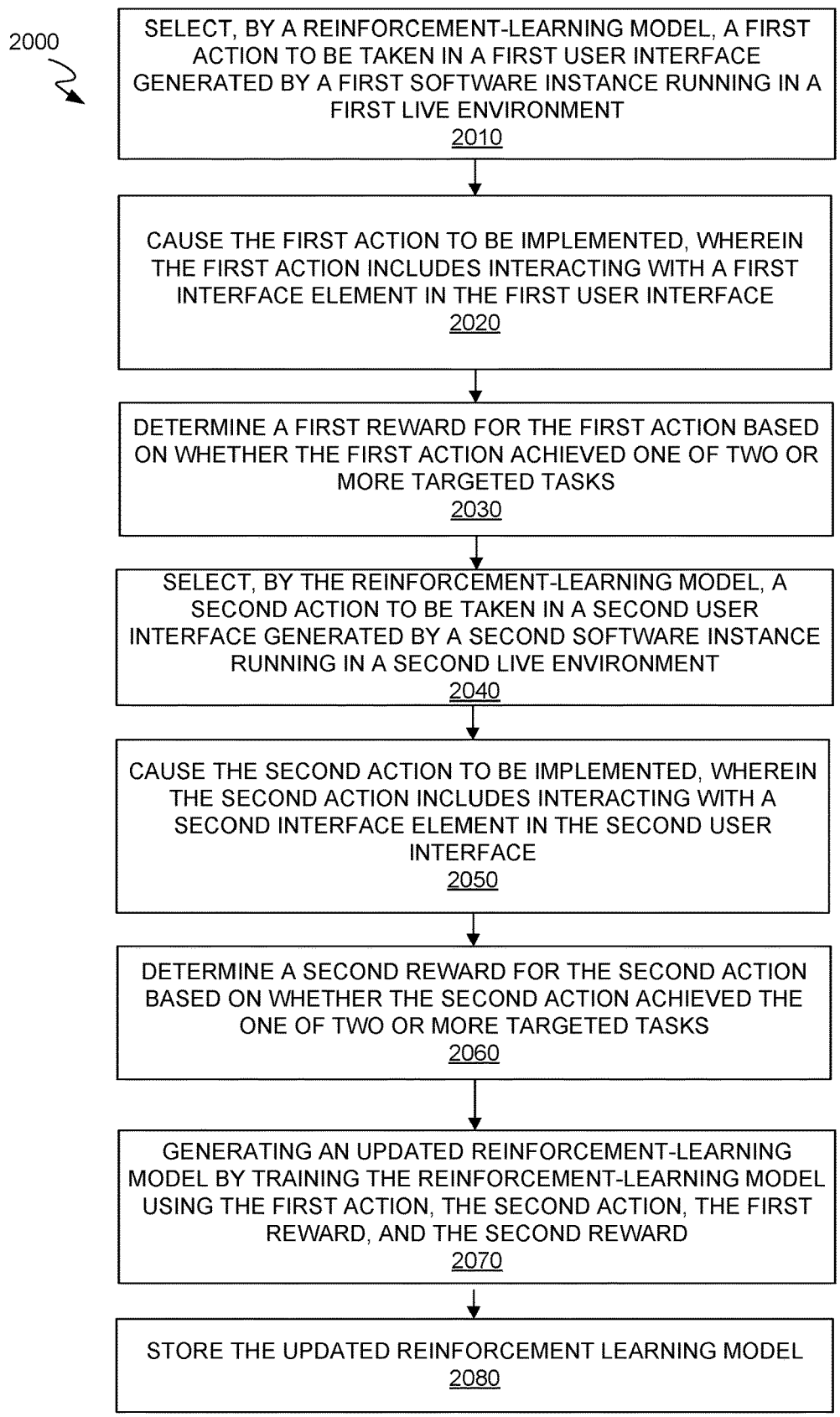
FIG. 20 is a flow chart illustrating use of a reinforcement-learning model in a cloud architecture, in accordance with aspects of the technology described herein.
Figure 21:
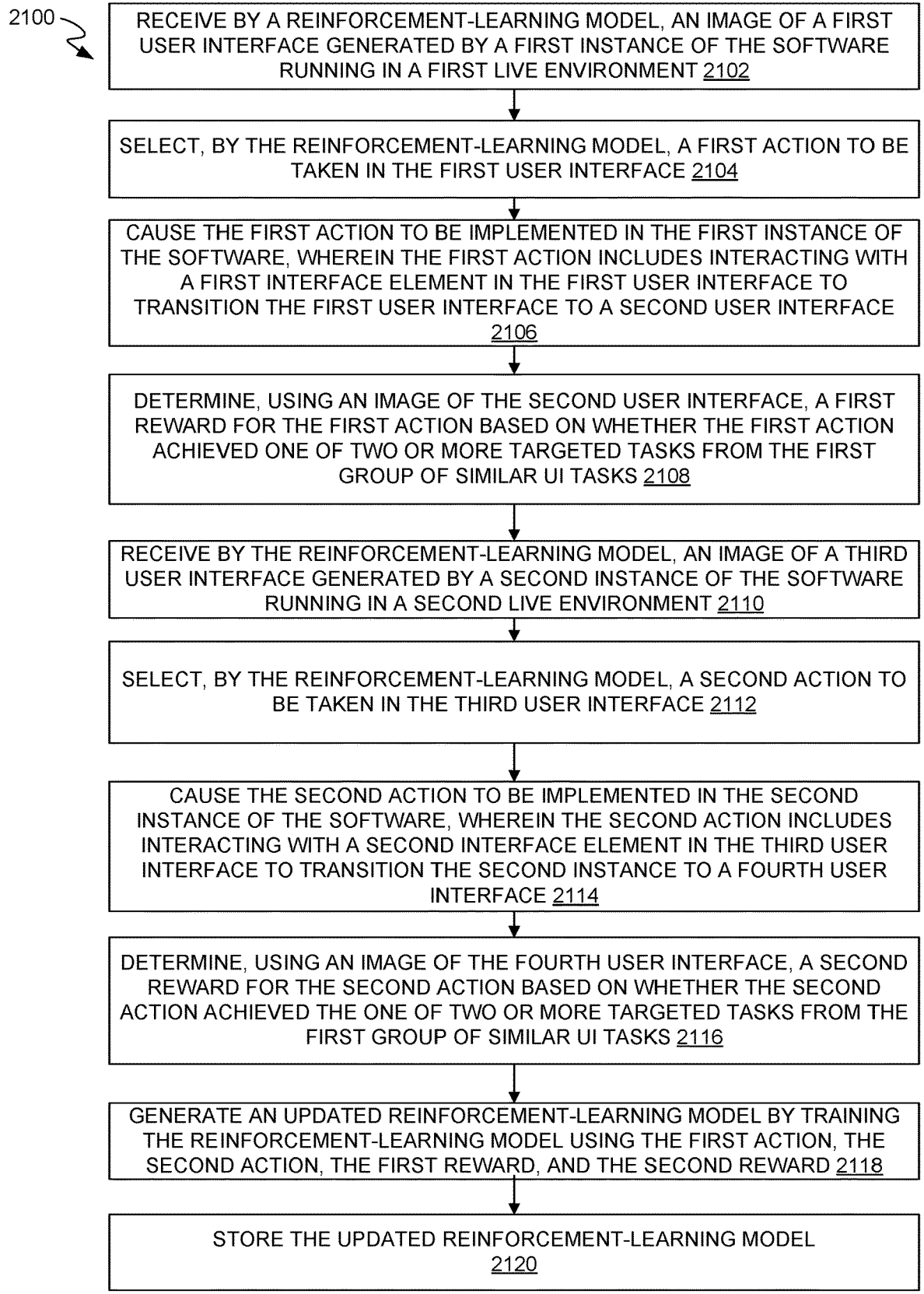
FIG. 21 is a flow chart illustrating use of a reinforcement-learning model in a cloud architecture, in accordance with aspects of the technology described herein.

Now referring to FIGS. 19-21, each block of methods 1900, 2000, and 2100, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be performed by a standalone application, a service or hosted service (standalone or in combination with another hosted service), to name a few. In addition, methods 1900, 2000, and 2100 are described, by way of example, with respect to FIGS. 1-6 and FIGS. 17 and 18. However, these methods may additionally or alternatively be executed by any one system, or any combination of systems, including, but not limited to, those described herein.

FIG. 19 describes a method 1900 of using a reinforcement-learning model in a distributed computing environment, according to an aspect of the technology described herein. Once tasks are learned, the tasks can be completed in a software testing process to determine whether performance of the tasks produces an unhealthy condition in the software and/or system being tested. Method 1900 may be performed in a cloud reinforcement-learning architecture that allows a single reinforcement-learning model to interact with multiple live software environments. The live software environments and the single reinforcement-learning model run in a distributed computing environment (e.g., cloud environment). The single reinforcement-learning model may run on a first computing device(s) with a GPU to aid in training the single reinforcement-learning model. The multiple live software environments may be provided by virtual machines running on a different computing device(s), which may not have a GPU.

Initially, an agent on a test machine may open a software instance being tested to a first user interface. The testing director 144 may specify the user interface to open. In aspects, the first user interface may be a default opening page for the software. For example, using MICROSOFT WORD as an example, the first interface may be the "Home" tab. In other aspects, the first user interface may be selected for testing a specific interface within a software instance. For example, again using MICROSOFT WORD as an example, the first interface may be the "Review" tab. In aspects, each software instance in each live environment opens to the same first user interface. In the alternative, software instances may be instructed to open to one or more different user interfaces.

In aspects, an image each user interface may be received by a reinforcement-learning model as an input used to select an action to be taken through the user interface. In aspects, state telemetry data for the first user interface may also be received.

At step 1910, the method 1900 includes selecting, by a reinforcement-learning model, a first action to take through the first user interface of a first software instance running in a first live environment. The first live environment may be running on a different computing device than the reinforcement-learning model. The action selected may be the action estimated to produce the highest reward (e.g., Q value). In other aspects, an exploration function causes the system to select an action with a lower estimated reward. For example, an action may be randomly selected from the actions with the top five estimated rewards. Actions may include all possible interactive actions with the software interface. In other words, actions may be any action (e.g., select, hover, enter text) a user could perform with an interface element (e.g., button, menu, text box).

In one aspect, the actions are determined from analyzing an image of the first user interface. The analysis may identify user interface elements (e.g., button, menu, text box) that can be interacted with. The analysis may also identify the type of interaction (e.g., click, scroll, enter text) that may be possible. In one aspect, the actions are determined through interrogation of an accessibility layer (e.g., the Microsoft UI Automation System).

At step 1920, the method 1900 includes causing the action to be performed. Causing the action to be implemented may include communicating an instruction to a testing agent on a test machine. The testing agent may then provide instructions to the software instance being tested. The action may include interacting with an interface element in the first user interface to transition the software instance to a second user interface. When the action is taken, action telemetry data describing the action may be received by a testing platform. The action telemetry data may be received from testing agents running on a plurality of test machines. The action telemetry data includes descriptions of actions (alternatively described simply as "actions") the various testing agents took on the test machines. The action may be taken through an accessibility layer.

In aspects, state telemetry data describing states of the first version of the software at points in time during testing may be received after an action is taken. The state telemetry data may be received from the product under test (i.e., instance of software being tested) on various TMs. The state telemetry data may include new interface elements presented in response to the action along with other changes (e.g., content changes) made to the interface. The state telemetry data may also include system and software health information, such as whether the system crashed, hung, or the like. In aspects, the state telemetry data may take the form of an image of the UI that resulted from an action.

At step 1930, the method 1900 includes determining a reward associated with the action. The reward may be associated with the state and the action that produced the state. A goal is to test functionality as users experience the functionality in applications and in an operating system shell. The reward function may be formulated differently in different experiments. In a first aspect, a positive reward is triggered if the action by the agent taken matches a target task completion state (e.g., when the agent takes the actions of clicking the Bold button or clicking the Font button from the menu) or achieves a target another state.

At step 1940, the method 1900 includes selecting, by the reinforcement-learning model, a second action to take through the first user interface of a second software instance running in a second live environment. The reinforcement-learning model used in step 1940 and step 1910 is the same model. The second live environment may be running on a different computing device than the reinforcement-learning model. The first user interface is being displayed in the first software instances and the second software instance. Both the first user interface and the second user interface have the same action options. However, the reinforcement-learning model selected a second action, instead of the first action despite making the selection based on the same content. The different selection from the same interface illustrates how exploration can be beneficial. In some selections, an action estimated to produce less than the highest reward (e.g., Q value) may be selected. The variation in actions may generate improved training data.

At step 1950, the method 1900 includes causing the second action to be performed. Causing the action to be performed may include communicating an instruction to a testing agent on a test machine. The testing agent may then provide instructions to the software instance being tested.

At step 1960, the method 1900 includes determining a reward associated with the second action. The rewards for the first and second actions may be the same or different.

At step 1970, the method 1900 includes generating an updated reinforcement-learning model by training the reinforcement-learning model using the first action, the second action, the first reward, and the second reward. Training may be a batch process that is conducted after a series of actions are taken and corresponding rewards collected. Training a reinforcement-learning model has been described previously with reference to FIGS. 5 and 6. The training method may be tailored to the model architecture.

At step 1980, the method 1900 includes storing the updated reinforcement-learning model. In aspects, the stored reinforcement-learning model then makes additional interaction choices and receives additional training in response to rewards received. Over time, the reinforcement-learning model may learn to complete one or more tasks. Once learned, the reinforcement-learning model can be used to test a software instance by completing the learned tasks and looking for unhealthy system or software conditions during completion.

FIG. 20 describes a method 2000 of using a reinforcement-learning model in a distributed computing environment, according to an aspect of the technology described herein. Once tasks are learned, the tasks can be completed in a software testing process to determine whether performance of the tasks produces an unhealthy condition in the software and/or system being tested. Method 2000 may be performed in a cloud reinforcement-learning architecture that allows a single reinforcement-learning model to interact with multiple live software environments. The live software environments and the single reinforcement-learning model run in a distributed computing environment (e.g., cloud environment). The single reinforcement-learning model may run on a first computing device(s) with a GPU to aid in training the single reinforcement-learning model. The multiple live software environments may be provided by virtual machines running on a different computing device(s), which may not have a GPU.

At step 2010, the method 2000 selects, by a reinforcement-learning model, a first action to be taken in a first user interface generated by a first software instance being tested in a first live environment. The action selected may be the action estimated to produce the highest reward (e.g., Q value). In other aspects, an exploration function causes the system to select an action with a lower estimated reward. For example, an action may be randomly selected from the actions with the top five estimated rewards.

Actions may include all possible interactive actions with the software interface. In other words, actions may be any action (e.g., select, hover, enter text) a user could perform with an interface element (e.g., button, menu, text box). In one aspect, the actions are determined from analyzing an image of the first user interface. The analysis may identify user interface elements (e.g., button, menu, text box) that can be interacted with. The analysis may also identify the type of interaction (e.g., click, scroll, enter text) that may be possible. In one aspect, the actions are determined through interrogation of an accessibility layer (e.g., the Microsoft UI Automation System).

At step 2020, the method 2000 causes the first action to be implemented. Causing the action to be implemented may include the testing director 144 communicating an instruction to a testing agent on a test machine, such as virtual machine. The testing agent may then provide instructions to the software instance being tested. The action includes interacting with an interface element in the first user interface to transition the software instance to a second user interface. When the action is taken, action telemetry data describing the action may be received by a testing platform. The action telemetry data may be received from testing agents running on a plurality of test machines. The action telemetry data includes descriptions of actions (alternatively described simply as "actions") the various testing agents took on the test machines. The action may be taken through an accessibility layer.

At step 2030, the method 2000 determines a reward for the first action based on whether the action achieved one of two or more targeted tasks. Two or more actions are available when the reinforcement-learning model is being taught to perform multiple tasks. Each task may be associated with the same reward. The reward may be associated with the state and the action that produced the state. A goal is to test functionality as users experience the functionality in applications and in an operating system shell. The reward function may be formulated differently in different experiments. In a first aspect, a positive reward is triggered if the action by the agent taken matches a target task completion state (e.g., when the agent takes the actions of clicking the Bold button or clicking the Font button from the menu) or achieves a target another state.

At step 2040, the method 2000 selects, by a reinforcement-learning model, a second action to be taken in a second user interface generated by a second software instance being tested in a second live environment. In method 2000, the first live environment and the second live environment have different interfaces. The first and second interfaces may be different as the reinforcement-learning model takes different paths through the first software instance and the second software instance. The action selected may be the action estimated to produce the highest reward (e.g., Q value). In other aspects, an exploration function causes the system to select an action with a lower estimated reward. For example, an action may be randomly selected from the actions with the top five estimated rewards.

At step 2050, the method 2000 causes the second action to be implemented. Causing the second action to be implemented may include the testing director 144 communicating an instruction to a testing agent on a test machine, such as virtual machine.

At step 2060, the method 2000 determines a reward for the first action based on whether the action achieved one of two or more targeted tasks. The reward may be associated with the state and the action that produced the state.

At step 2070, the method 2000 generates an updated reinforcement-learning model by training the reinforcement-learning model using the first action, the second action, the first reward, and the second reward. Training may be a batch process that is conducted after a series of actions are taken and corresponding rewards collected. Hundreds of action/reward combinations may be used retrain the reinforcement-learning model. Training a reinforcement-learning model has been described previously with reference to FIGS. 5 and 6. The training method may be tailored to the model architecture. In an aspect, the reinforcement-learning model is trained on multiple tasks. In one aspect, the training is a serial process where a first task is trained, then a second task, and so on. In aspects, the first task may be the easiest to learn and the last task the most complex. The complexity may be measured in a number of sequential actions needed to complete the task.

At step 2080, the method 2000 stores the updated reinforcement-learning model. In aspects, the stored reinforcement-learning model then makes additional interaction choices, and the agent may cause the interactions to be implemented. The reinforcement-learning model receives additional training in response to rewards associated with the additional interactions. Over time, the reinforcement-learning model may learn to complete one or more tasks. Once learned, the reinforcement-learning model can be used to test a software instance by completing the learned tasks and looking for unhealthy system or software conditions during completion.

FIG. 21 describes a method 2100 of using a reinforcement-learning model in a distributed computing environment, according to an aspect of the technology described herein. Once tasks are learned, the tasks can be completed in a software testing process to determine whether performance of the tasks produces an unhealthy condition in the software and/or system being tested. Method 2100 may be performed in a cloud reinforcement-learning architecture that allows a single reinforcement-learning model to interact with multiple live software environments. The live software environments and the single reinforcement-learning model run in a distributed computing environment (e.g., cloud environment). The single reinforcement-learning model may run on a first computing device(s) with a GPU to aid in training the single reinforcement-learning model. The multiple live software environments may be provided by virtual machines running on a different computing device(s), which may not have a GPU.

It may be beneficial to train reinforcement-learning model to learn multiple similar tasks. A similarity analysis may be conducted on UI tasks that are performable within a software to generate a first group of similar UI tasks. The technology described herein may train a reinforcement-learning model to perform multiple tasks. When training a reinforcement-learning model on multiple tasks, performance may be enhanced by training the model to perform similar tasks. Similar tasks may have one or more common steps. For example, tasks performed from the same menu may include opening the menu.

There are multiple ways to determine similarity. For example, the image of the interface upon achieving a target state may be compared to images of the interface upon achieving a different target state. Visual similarity methods may be used to measure the difference between images. These methods include RMSE, peak PSNR, SSIM, and FSIM.

In another aspect, language encoding of a task description is used to determine similarity. In this method, "change font color to red" should be similar to "change font color to blue."

At step 2102, the method 2100 includes receiving, by a reinforcement-learning model, an image of a first user interface generated by an instance of the software running in a first live environment. In aspects, state telemetry data for the first user interface may also be provided.

At step 2104, the method 2100 includes selecting, by the reinforcement-learning model, a first action to take through the first user interface. The first action selected may be the action estimated to produce the highest reward (e.g., Q value). In other aspects, an exploration function causes the system to select an action with a lower estimated reward. For example, an action may be randomly selected from the actions with the top five estimated rewards.

Actions may include all possible interactive actions with the software interface. In other words, actions may be any action (e.g., select, hover, enter text) a user could perform with an interface element (e.g., button, menu, text box). In one aspect, the actions are determined from analyzing an image of the first user interface. The analysis may identify user interface elements (e.g., button, menu, text box) that can be interacted with. The analysis may also identify the type of interaction (e.g., click, scroll, enter text) that may be possible. In one aspect, the actions are determined through interrogation of an accessibility layer (e.g., the Microsoft UI Automation System).

At step 2106, the method 2100 includes causing the first action to be implemented. Causing the first action to be implemented may include communicating an instruction to a testing agent on a test machine. The testing agent may then provide instructions to the software instance being tested. Where the action includes interacting with an interface element in the first user interface to transition the first user interface to a second user interface. When the action is taken, action telemetry data describing the action may be provided to a testing platform. The action telemetry data may be received from testing agents running on a plurality of test machines. The action telemetry data includes descriptions of actions (alternatively described simply as "actions") the various testing agents took on the test machines. The action may be taken through an accessibility layer.

At step 2108, the method 2100 includes determining, using an image of the second user interface, a first reward for the first action based on whether the first action achieved one of two or more targeted tasks from the first group of similar UI tasks. In this case, the reward is based on whether one of several different tasks was accomplished. In this way, multiple actions and resulting states may receive a reward. In an aspect, completion of each task is associated with a reward.

At step 2110, the method 2100 includes receiving, by the reinforcement-learning model, an image of a third user interface generated by a second instance of the software running in a second live environment. In aspects, state telemetry data for the first user interface may also be provided.

At step 2112, the method 2100 includes selecting, by the reinforcement-learning model, a second action to take through the third user interface. The second action selected may be the action estimated to produce the highest reward (e.g., Q value). In other aspects, an exploration function causes the system to select an action with a lower estimated reward. For example, an action may be randomly selected from the actions with the top five estimated rewards.

At step 2114, the method 2100 includes causing the second action to be implemented. Causing the second action to be implemented may include communicating an instruction to a testing agent on a test machine. The testing agent may then provide instructions to the software instance being tested. Where the second action includes interacting with an interface element in the third user interface to transition the third user interface to a fourth user interface. When the action is taken, action telemetry data describing the action may be provided to a testing platform. The action telemetry data may be received from testing agents running on a plurality of test machines. The action telemetry data includes descriptions of actions (alternatively described simply as "actions") the various testing agents took on the test machines. The action may be taken through an accessibility layer.

At step 2116, the method 2100 includes determining, using an image of the fourth user interface, a second reward for the second action based on whether the second action achieved one of two or more targeted tasks from the first group of similar UI tasks. In this case, the reward is based on whether one of several different tasks was achieved. In this way, multiple actions and resulting states may receive a reward. In an aspect, completion of each task is associated with a reward.

At step 2160, the method 2100 includes generating an updated reinforcement-learning model by training the reinforcement-learning model using the first action, the second action, the first reward, and the second reward. Training may be a batch process that is conducted after a series of actions are taken and corresponding rewards collected. Training a reinforcement-learning model has been described previously with reference to FIGS. 5 and 6. The training method may be tailored to the model architecture.

At step 2170, the method 2100 includes storing the updated reinforcement-learning model. In aspects, the stored reinforcement-learning model then makes additional interaction choices and receives additional training in response to rewards received. Over time, the reinforcement-learning model may learn to complete one or more tasks. Once learned, the reinforcement-learning model can be used to test a software instance by completing the learned tasks and looking for unhealthy system or software conditions during completion.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. Low-level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the testing environment can include an API library that includes specifications for routines, data structures, object classes, and variables may support the interaction between the hardware architecture of the device and the software framework of the testing environment. These APIs include configuration specifications for the testing environment such that the different components therein can communicate with each other in the testing environment, as described herein.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the testing environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A method of automated software testing comprising:
selecting, by a reinforcement-learning model, a first action to be taken in a first user interface of a first software instance running in a first live environment;
causing the first action to be performed, wherein the first action includes interacting with a first interface element in the first user interface;
determine a first reward associated with the first action;
selecting, by the reinforcement-learning model, a second action to be taken in the first user interface of a second software instance running in a second live environment;
causing the second action to be performed, wherein the second action includes interacting with a second interface element in the first user interface;
determine a second reward associated with the second action;
generating an updated reinforcement-learning model by training the reinforcement-learning model using the first action, the second action, the first reward, and the second reward; and
storing the updated reinforcement-learning model.

2. The method of claim 1, wherein the method further comprises inputting an image of the first user interface to the reinforcement-learning model.

3. The method of claim 1, wherein the first software instance and the second software instance are both instances of a single software version.

4. The method of claim 1, wherein a reward determined for accomplishing a task has a larger magnitude than the reward for not accomplishing the task.

5. The method of claim 1, wherein the first software instance is running on a first computing device and the reinforcement-learning model is running on a second computing device.

6. The method of claim 1, wherein the method further comprises monitoring health telemetry received from the first live environment to detect a bug in the first software instance being tested.

7. The method of claim 1, wherein the reinforcement-learning model is a deep Q network model.

8. A computer system comprising:
a processor; and
memory configured to provide computer program instructions to the processor, the computer program instructions including a reinforcement-learning tool configured to:
select, by a reinforcement-learning model, a first action to be taken in a first user interface generated by a first software instance running in a first live environment;
cause the first action to be implemented, wherein the first action includes interacting with a first interface element in the first user interface;
determine a first reward for the first action based on whether the first action achieved one of two or more targeted tasks;
select, by the reinforcement-learning model, a second action to be taken in a second user interface generated by a second software instance running in a second live environment;

cause the second action to be implemented, wherein the second action includes interacting with a second interface element in the second user interface;

determine a second reward for the second action based on whether the second action achieved the one of two or more targeted tasks;

generating an updated reinforcement-learning model by training the reinforcement-learning model using the first action, the second action, the first reward, and the second reward; and store the updated reinforcement-learning model.

9. The computer system of claim 8, wherein the reinforcement-learning tool is further configured to perform a similarity evaluation to determine the two or more tasks.

10. The computer system of claim 8, wherein the first software instance is running on a first computing device and the reinforcement-learning model is running on a second computing device.

11. The computer system of claim 10, wherein a communication between the first computing device and the second computing device is managed by an asynchronous message management system.

12. The computer system of claim 8, wherein the reinforcement-learning tool is further configured to input an image of the first user interface to the reinforcement-learning model.

13. The computer system of claim 8, wherein, prior to selecting the first action, the reinforcement-learning model.

14. The computer system of claim 8, wherein the reinforcement-learning tool is further configured to monitor health telemetry received from the first live environment to detect a bug in the first software instance being tested.

15. The computer system of claim 8, wherein the reinforcement-learning model is a proximal policy optimization model.

16. A computer storage medium storing computer-useable instructions that, when used by a computing device, cause the computing device to perform operations comprising:

receiving, by a reinforcement-learning model, a first image of a first user interface generated by a first instance of the software running in a first live environment;

selecting, by the reinforcement-learning model, a first action to be taken in the first user interface;

causing the first action to be implemented in the first instance of the software, wherein the first action includes interacting with a first interface element in the first user interface to transition the first user interface to a second user interface;

determining, using a second image of the second user interface, a first reward for the first action based on whether the first action achieved one of two or more targeted tasks from a first group of user interface tasks;

receiving, by the reinforcement-learning model, a third image of a third user interface generated by a second instance of the software running in a second live environment;

selecting, by the reinforcement-learning model, a second action to be taken in the third user interface;

causing the second action to be implemented in the second instance of the software, wherein the second action includes interacting with a second interface element in the third user interface to transition the second instance to a fourth user interface;

determining, using a fourth image of the fourth user interface, a second reward for the second action based on whether the second action achieved the one of two or more targeted tasks from the first group of user interface tasks;

generating an updated reinforcement-learning model by training the reinforcement-learning model using the first action, the second action, the first reward, and the second reward; and storing the updated reinforcement-learning model.

17. The computer storage medium of claim 16, wherein the first live environment is provided by first virtual machine and the second live environment is provided by a second virtual machine.

18. The computer storage medium of claim 17, wherein causing the first action to be implemented comprises communicating an instruction to a test agent on the first virtual machine.

19. The computer storage medium of claim 16, wherein the reinforcement-learning model includes a convolutional layer.

20. The computer storage medium of claim 16, wherein the first instance is running on a first computing device and the reinforcement-learning model is running on a second computing device.

* * * * *